United States Patent
Zeine et al.

(10) Patent No.: US 10,312,744 B2
(45) Date of Patent: *Jun. 4, 2019

(54) TECHNIQUES FOR DELIVERING PULSED WIRELESS POWER

(71) Applicant: Ossia Inc., Bellevue, WA (US)

(72) Inventors: Hatem Zeine, Bellevue, WA (US); Thomas H. Wilson, Kirkland, WA (US); K. Kenneth Clark, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/367,900

(22) Filed: Dec. 2, 2016

(65) Prior Publication Data

US 2017/0085129 A1     Mar. 23, 2017

Related U.S. Application Data

(63) Continuation of application No. 14/171,750, filed on Feb. 3, 2014, now Pat. No. 9,553,473.

(60) Provisional application No. 61/760,648, filed on Feb. 4, 2013.

(51) Int. Cl.
| | |
|---|---|
| *H02J 7/04* | (2006.01) |
| *H02J 7/16* | (2006.01) |
| *H02J 50/27* | (2016.01) |
| *H02J 7/02* | (2016.01) |
| *H02J 50/20* | (2016.01) |
| *H02J 50/80* | (2016.01) |
| *H02J 50/40* | (2016.01) |

(Continued)

(52) U.S. Cl.
CPC .............. *H02J 50/27* (2016.02); *H02J 7/025* (2013.01); *H02J 50/10* (2016.02); *H02J 50/20* (2016.02); *H02J 50/40* (2016.02); *H02J 50/80* (2016.02); *H02J 7/0004* (2013.01); *H02J 7/0013* (2013.01)

(58) Field of Classification Search
CPC .......... H02J 7/0093; H02J 7/022; H02J 7/008; Y02E 60/12; H01M 10/44
USPC ......................................................... 320/141
See application file for complete search history.

(56) References Cited

U.S. PATENT DOCUMENTS

| | | |
|---|---|---|
| 4,641,140 A | 2/1987 | Heckaman et al. |
| 5,400,037 A | 3/1995 | East |
| 6,300,763 B1 | 10/2001 | Kwok |

(Continued)

FOREIGN PATENT DOCUMENTS

| | | |
|---|---|---|
| JP | 2009-33954 A | 2/2009 |
| JP | 2009-268311 A | 11/2009 |

(Continued)

OTHER PUBLICATIONS

Japanese Patent Application No. 2015-556238, Office Action, 17 pages, dated Jan. 23, 2018.

(Continued)

*Primary Examiner* — Arun C Williams

(57) ABSTRACT

A transmitter assembly is useful in optimizing in the delivery of wireless power to a plurality of receivers. Each receiver measures its own battery need for power and transmits that measurement as a request to the transmitter. The transmitter is configured to normalize and compare battery need requests. The transmitter then allocates pulses of wireless power among the requesting receivers according to their battery need.

20 Claims, 10 Drawing Sheets

(51) Int. Cl.
*H02J 50/10* (2016.01)
*H02J 7/00* (2006.01)

(56) References Cited

U.S. PATENT DOCUMENTS

| | | |
|---|---|---|
| 6,399,763 B1 | 6/2002 | Frenken et al. |
| 6,952,456 B1 | 10/2005 | Aiello et al. |
| 6,965,355 B1 | 11/2005 | Durham et al. |
| 7,083,104 B1 | 8/2006 | Empedocles et al. |
| 7,088,306 B2 | 8/2006 | Chiang et al. |
| 7,521,890 B2 * | 4/2009 | Lee .............. H02J 5/005 320/108 |
| 8,159,364 B2 | 4/2012 | Zeine |
| 2004/0201526 A1 | 10/2004 | Knowles et al. |
| 2005/0057431 A1 | 3/2005 | Brown et al. |
| 2007/0149162 A1 | 6/2007 | Greene et al. |
| 2009/0033280 A1 | 2/2009 | Choi et al. |
| 2009/0212265 A1 | 8/2009 | Steinhardt et al. |
| 2009/0271048 A1 | 10/2009 | Wakamatsu |
| 2009/0284082 A1 | 11/2009 | Mohammadian |
| 2010/0046427 A1 * | 2/2010 | Li .............. H04B 7/0686 370/328 |
| 2010/0181961 A1 | 7/2010 | Novak et al. |
| 2010/0315045 A1 | 12/2010 | Zeine |
| 2011/0115303 A1 | 5/2011 | Baarman et al. |
| 2011/0115431 A1 | 5/2011 | Dunworth et al. |
| 2011/0127951 A1 | 6/2011 | Walley et al. |
| 2011/0304409 A1 | 12/2011 | Tamura |
| 2012/0001802 A1 * | 1/2012 | Grau Besoli .......... H04B 7/084 342/373 |
| 2012/0025622 A1 | 2/2012 | Kim et al. |
| 2012/0112692 A1 | 5/2012 | Arai |
| 2012/0139780 A1 | 6/2012 | Wang et al. |
| 2012/0300875 A1 | 11/2012 | Kwon et al. |
| 2012/0313450 A1 | 12/2012 | Nam et al. |
| 2014/0232330 A1 * | 8/2014 | Robertson ........... H01M 2/1022 320/108 |

FOREIGN PATENT DOCUMENTS

| | | |
|---|---|---|
| JP | 2010-530210 A | 9/2010 |
| JP | 2011-205788 A | 10/2011 |
| JP | 2011-205854 A | 10/2011 |
| JP | 2012-125112 A | 6/2012 |
| JP | 2012-175763 A | 9/2012 |
| JP | 2013-005687 A | 1/2013 |
| JP | 2013-538548 A | 10/2013 |
| WO | WO 2012/027166 A1 | 3/2012 |

OTHER PUBLICATIONS

Japanese Patent Application No. 2015-556238, Office Action, 6 pages, dated Jan. 8, 2019.

* cited by examiner

TECHNIQUES FOR DELIVERING PULSED WIRELESS POWER

CROSS REFERENCE TO RELATED APPLICATIONS

This application is a continuation of and claims priority to U.S. patent application Ser. No. 14/171,750, entitled "SYSTEMS AND METHODS FOR OPTIMALLY DELIVERING PULSED WIRELESS POWER ENHANCED REPLICATION FOR MESSAGE SERVICES," filed on Feb. 3, 2014, which claims priority to and benefit from U.S. Provisional Patent Application Ser. No. 61/760,648, filed on Feb. 4, 2013, by the same title, both of which are expressly incorporated by reference herein.

BACKGROUND

Many useful applications are based on the transmission of wireless pulses. Examples include radar detection using transmitted and reflected pulsed microwave signals as well as medical ablation procedures that use pulsed microwave to ablate targeted body tissues.

Concerning pulsed signals used to deliver power wirelessly, the company Powercast filed patent application US20070149162 in January 2007. That application discusses pulsing in order to optimize the delivery of wireless power.

The above patent application (US20070149162) discusses certain advantages of pulsing for wireless power delivery, including:
  Increased rectifier efficiency;
  Larger output voltages; and
  Less average transmitted power used to obtain the same received DC power.

Transmitting less average power has the following advantages:
  Decreasing the human safety distance;
  Allowing operation in an increasing number of bands;
  Recharging at a lower average output than continuous wave power transmission; and
  Greater distances of higher power levels, as well as penetration of RF-attenuating objects without increasing the average output power.

However, US20070149162 fails to disclose the unique challenges posed by delivering power wirelessly, and thus does not address solutions to these unique challenges. These challenges include:
  Sequential delivery;
  Attenuation of reception;
  Variable state of charge; and
  Storage drain rate.
  Each of these challenges is described below.

Sequential delivery refers to fact that in wireless power systems, typically most or all of the power generated by the transmitter is delivered to one or a few receivers at a time. One reason is because signal strength drops significantly with distance due to the inverse-square law (the intensity of the signal falls off proportionally to the square of the distance). This means that at any one time, most or all of the transmitter power is preferentially delivered to only one or a few receivers.

Attenuation of reception references the fact that the strength of a power signal received by a receiver can be diminished by various factors, including distance from transmitter, obstacles between transmitter and receiver, and orientation of receiver.

Variable state of charge concerns the state of the charge-holding apparatus in the receiver. Normally, this apparatus is a battery, but it could also be a capacitor. This charge-holding device exhibits a state of charge ranging from empty to full.

Storage drain rate concerns the rate at which the charge-holding apparatus (e.g., battery) is losing charge.

This invention describes solutions to these core problems of wireless power delivery.

SUMMARY

In accordance with the present invention, systems and methods for optimally delivering pulsed wireless power using a transmitter assembly that is useful in optimizing the delivery of wireless power to a plurality of receivers is provided. Each receiver measures its own battery need for power and transmits that measurement as a request to the transmitter. The transmitter is configured to normalize and compare battery need requests. The transmitter then allocates pulses of wireless power among the requesting receivers according to their battery need.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential term's, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
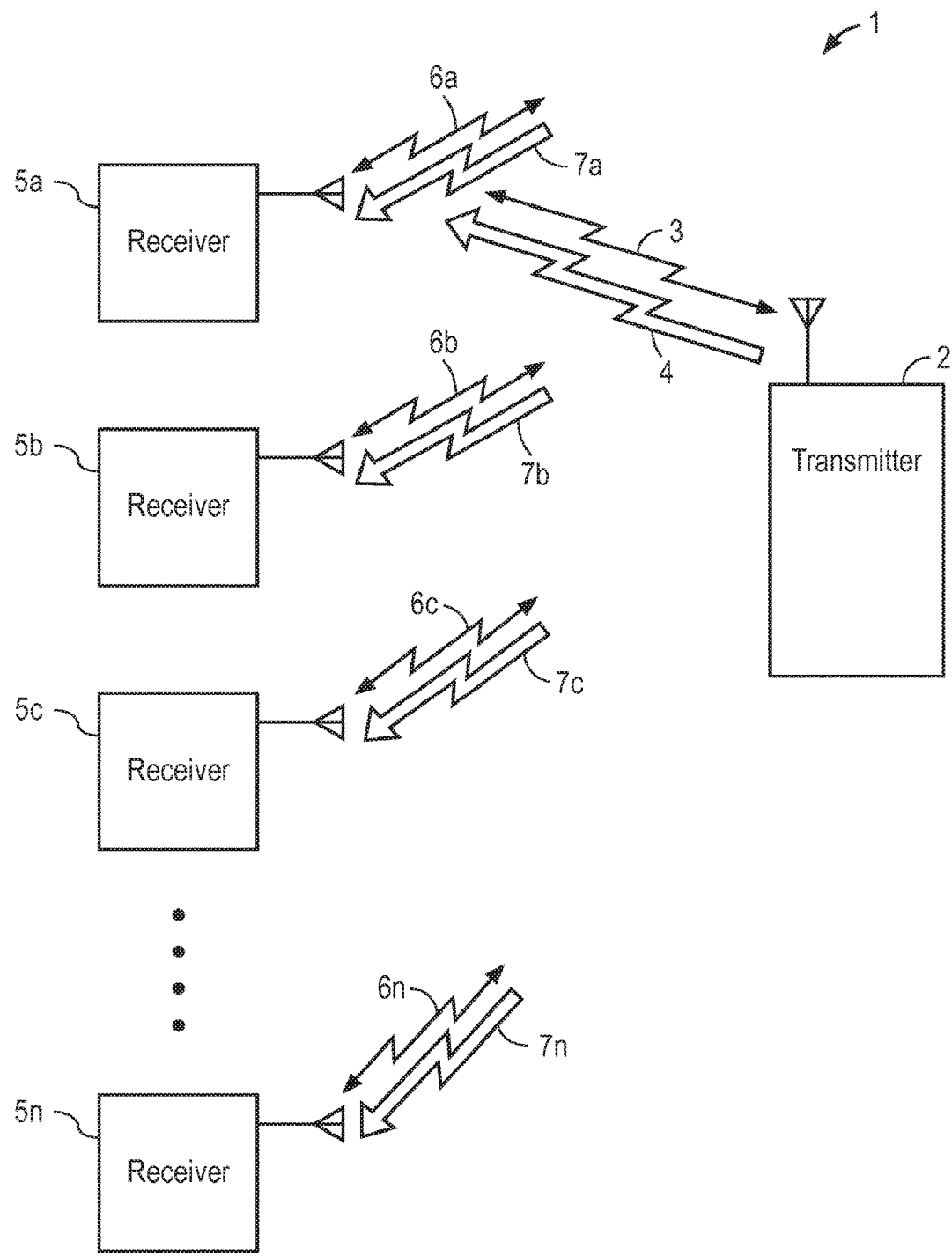
FIG. 1 shows a high level block diagram demonstrating a wireless transmitter and multiple receivers.

The present invention concerns systems and methods of pulsed wireless power transmission and reception. FIG. 1 shows a high level block diagram 1 demonstrating a transmitter 2 transmitting wireless communications 3 as well as wireless power 4. A plurality of receivers 5a, 5b, 5c, ... 5n communicates with the transmitter 2 through wireless signals 6a, 6b, 6c, ... 6n respectively. Receivers 5a, 5b, 5c, ... 5n collect needed wireless power 7a, 7b, 7c, ... 7n transmitted by the transmitter 2.

Pulsing of the wireless power signal facilitates sequential delivery in that individual pulses can be allocated to different receivers by changing any of phase, frequency, time, amplitude, or direction of a transmitter. Although the detailed description herein concerns phase focused pulsing, this invention is equally applicable to any other signal modification approach.

Moreover, the description below describes the delivery of pulses to one receiver at a time. But this invention includes approaches that involve powering a subset of receivers at a time. For example, in a frequency modulated pulsing approach, some subset of receivers might be tuned to receive a certain frequency. When the transmitter delivers a pulse of that frequency, this subset of more than one receiver would be simultaneously charged.

In one embodiment of the described invention, the delivery of wireless power by a transmitter to a plurality of receivers is disclosed. The discussion below concerns batteries as the means of charge storage for these receivers. But this invention applies equally to any means of charge storage, including capacitors and super-capacitors.

Moreover, beyond battery needs for power, some receivers might have a more critical/urgent need for power than other receivers. For example, life-preserving receivers (for example, a heart pump) would have a more critical need for power than non-critical ones (for example, a toy)—a need that is independent of the respective battery power needs of the two devices.

One embodiment of the described invention concerns variable battery needs. Satisfying variable battery needs of one or more receivers involves the following functions:
Measuring battery need;
Communicating battery need;
Receiving battery need; and
Satisfying battery need.

In measuring battery need there are multiple schemes that receivers use to determine their needs before sending them to the transmitter. These schemes range from simple measurements of voltages and currents, to sophisticated calculations. Some of the latter can even be predictive, presenting estimations about expected conditions in the future and determining amounts of power such that those anticipated needs will be filled should they occur.

The receiver must take various measurements and, in some embodiments, make various calculations before it can send the needed information to the transmitter.

Electronic circuits located within or associated with the receiver measure core metrics required for calculating battery need. Three continuously varying metrics (the "Battery Need Metrics") useful for measuring battery need are:
State of charge ("StateOfCharge") which describes how the battery is charged;
Drain rate ("DrainRate") which describes how fast the battery charge is draining; and
Received power ("ReceivedPower") which describes power the battery is receiving.

All things being equal between two batteries, one of them will have a greater need for power if:
Its StateOfCharge is lower than that of the other;
Its DrainRate is higher than that of the other; or
Its ReceivedPower is lower than that of the other.

For a typical battery, each of the three Battery Need Metrics tends to vary relatively frequently (e.g. within seconds or fractions of a second).

Electronic circuits within the receiver measure some or all of the Battery Need Metrics. The discussion below describes alternative embodiments of these circuits.

Figure 2A:
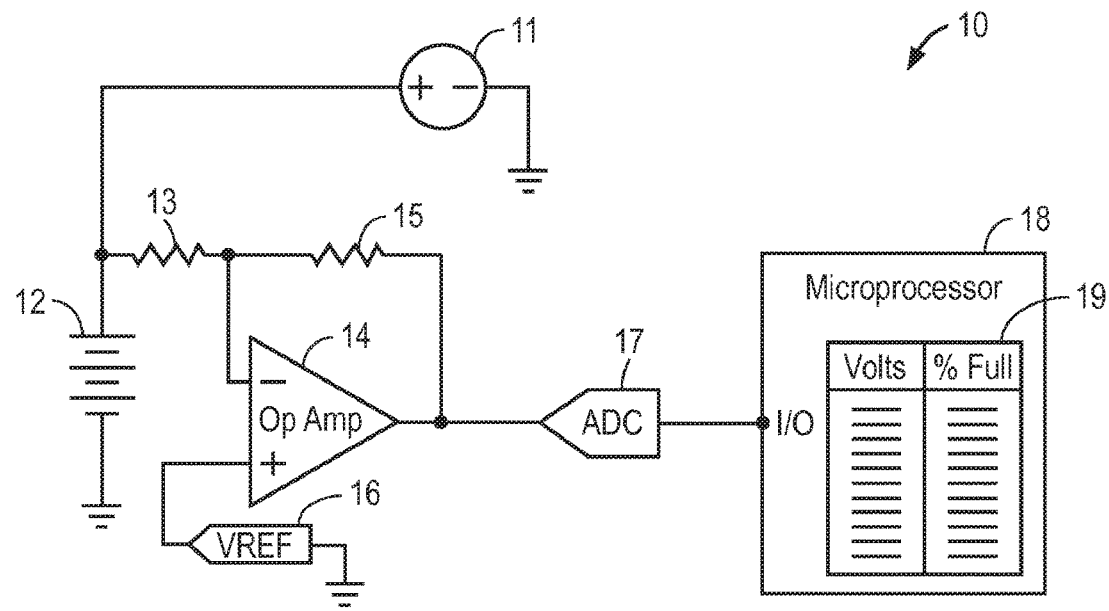
FIG. 2A depicts a circuit configured to calculate a state of charge of a battery.

The first of these embodiments discloses an individual circuit for each metric. FIG. 2A depicts a circuit 10 configured to calculate the StateOfCharge of a battery. In the circuit 10, a voltage supply 11 represents a received power that charges a battery 12. The battery 12 is connected through a resistor 13 to an Operational Amplifier ("OpAmp") 14. A second resistor 15 sets the gain of the OpAmp 14. The OpAmp positive "+" terminal is connected to a voltage reference ("VREF") 16 that can be set in at least two ways.

In a first way of the at least two ways of setting the voltage reference (VREF) 16, its voltage is set higher than the highest expected voltage value for the battery. This will make the OpAmp 14 produce a range of positive values for an Analog-to-Digital Converter ("ADC") 17 regardless of the battery's state of charge. The ADC 17 digitizes the signal from the OpAmp 14 and presents 8 bits of data to a Microprocessor 18. The Microprocessor 18 can be configured to generate a table 19 listing the battery voltage and the percentage full of the battery.

In a second way of the at least two ways for setting the voltage reference (VREF) 16, its voltage is set to match a voltage value slightly higher than that which the battery will reach when it can no longer safely provide power. This changed sign is an easily tested condition by the Microprocessor 18, and may make the software easier to write.

Figure 2B:
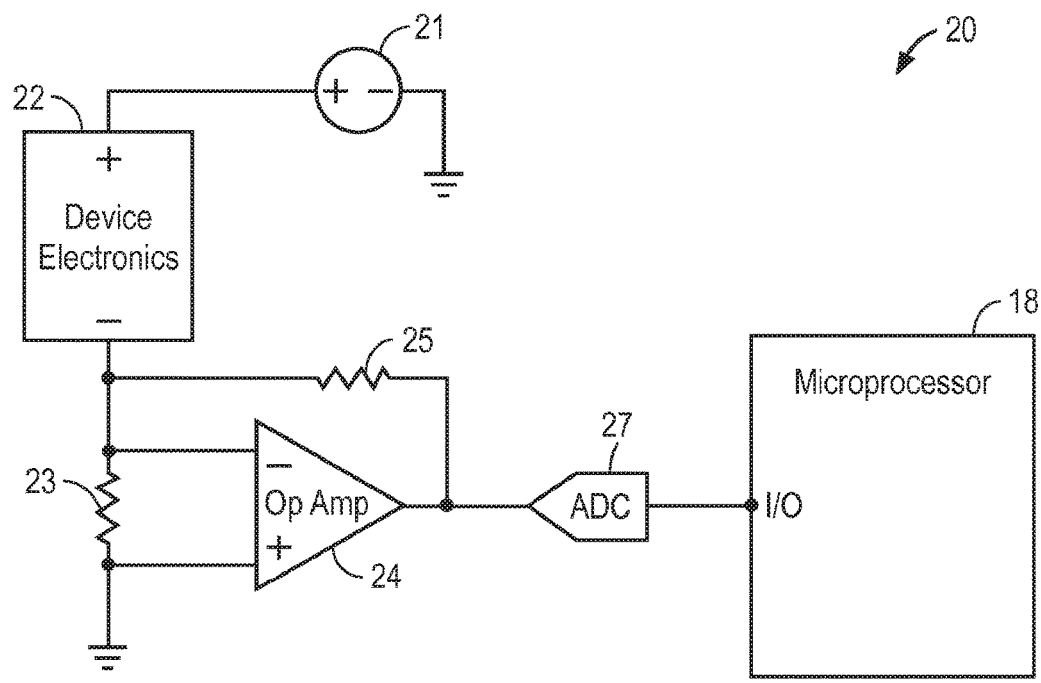
FIG. 2B depicts a circuit configured to calculate a power drain rate of the battery.

FIG. 2B depicts a circuit 20 configured to calculate the DrainRate of a battery. The circuit 20 comprises a Device Electronics 22 with the "+" power terminal connected to a voltage supply 21 that represents the received power, and the "−" power terminal connected to two resistors 23 and 25 and an OpAmp 24. The two resistors 23 and 25 set the gain of the OpAmp 24.

The resistor 23 connects the positive"+" and the negative "−" input terminals of the OpAmp 24 together, and has a very low resistance (for example, on the order of one to five milli Ohms).

The resistor 25 connects the negative "−" input of the OpAmp 24 to the output terminal of the OpAmp 24. The OpAmp 24 output signal is connected to the input of an ADC 27. The ADC 27 digitizes the signal from the OpAmp 24 and presents 8 bits of data to a Microprocessor 28.

The resistor 25 should be selected so that the maximum expected power draw (by the Device Electronics 22) causes an output voltage from the OpAmp 24 near the maximum value that the ADC 27 input stage can read.

Figure 3:
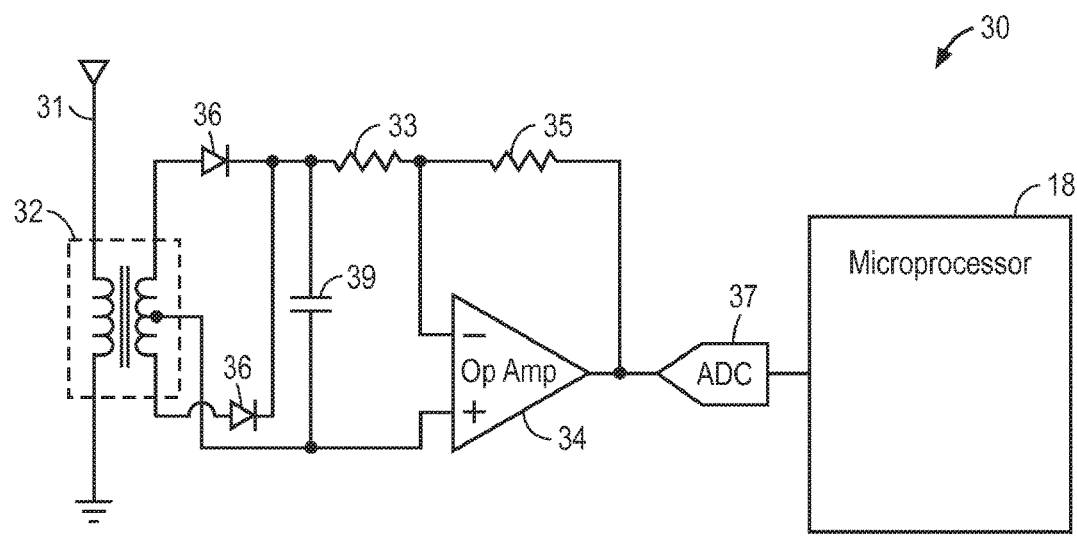
FIG. 3 depicts a circuit configured to calculate a received power by the battery.

ReceivedPower can be calculated using a circuit 30 depicted in FIG. 3. An antenna 31 is connected to the primary of a transformer 32. The secondary of the transformer 32 is connected to the rectifying diodes 36 and a capacitor 39. A voltage across the capacitor 39 is essentially DC (direct current with some ripple) and is configured to be proportional to the power being received by the antenna.

Figure 4:
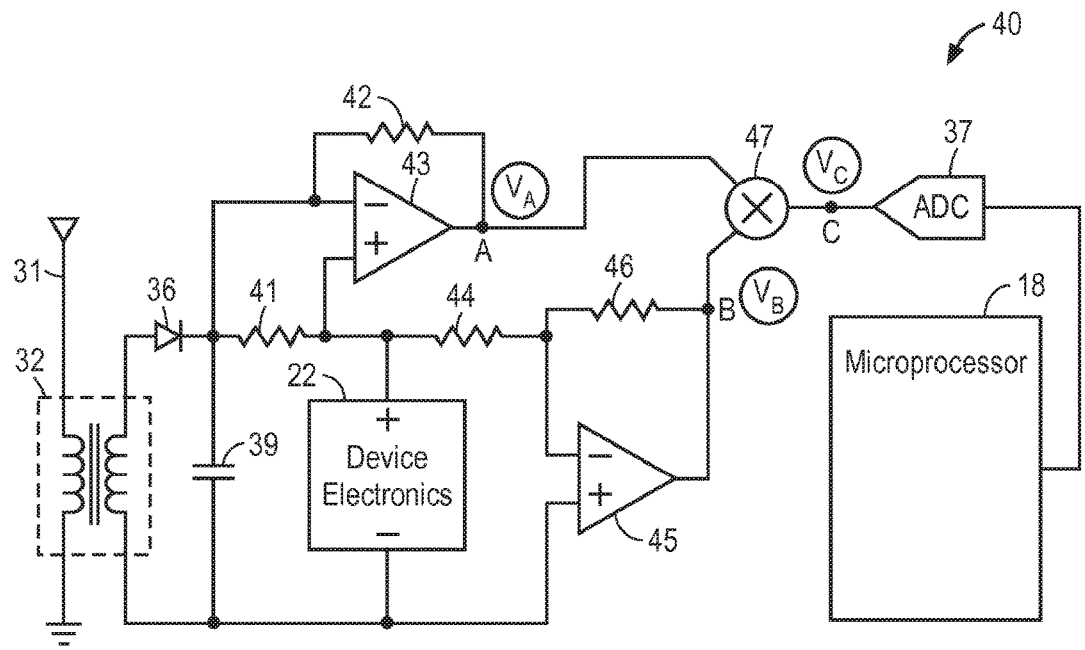
FIG. 4 depicts an alternative circuit configured to calculate the received power by the battery.

An alternative embodiment for calculating the ReceivedPower is shown in FIG. 4. The circuit 40 is configured to measure both the current flowing into the "Device Electronics" 22 in addition to the voltage across the capacitor 39. The analog voltage at point A, "$V_A$" is proportional to the current flowing into the "Device Electronics" 22. The analog voltage at point B, "$V_B$" is proportional to the voltage across the capacitor 39. The analog voltages $V_A$ and $V_B$ are multiplied in a mixer 47. Thus, the output voltage of the mixer 47 at point C. "$V_C$" is proportional to the power being received by the antenna. The voltage $V_C$ is digitized in the ADC 37 and then fed to the microprocessor 18. The circuit 40 thus can be configured to provide the power, in watts, being delivered wirelessly to the receiver.

In yet another embodiment for measuring the ReceivedPower the analog voltages $V_A$ and $V_B$, in FIG. 4, can be digitized using two Analog-to-Digital Converters (ADCs), not shown. Then the output of the two ADCs can be easily multiplied digitally and the digitized result is made available to the microprocessor 18.

In an alternative embodiment, a single electronic circuit can be configured to measure all three of the Battery Need Metrics. This embodiment makes six measurements (the "Raw Metrics"):

V[RF] (volts from RF)
A[RF] (amps from RF)
V[S] (volts at storage)
A[S] (amps at storage)
V[D] (volts at device)
A[D] (amps at device)

Figure 5:
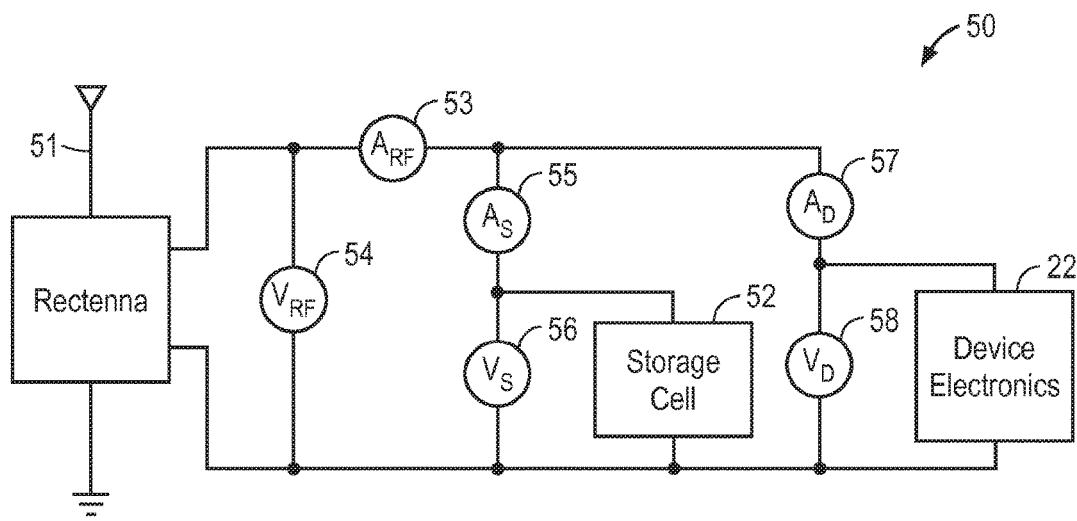
FIG. 5 depicts a circuit configured to calculate the state of charge, the power drain rate, and the received power by the battery.

The six Raw Metrics are measured using the circuit 50, depicted in FIG. 5, A rectifying antenna (rectenna) 51 feeds power to a Storage Cell 52 (e.g. battery) through ammeter A[RF] 53. The Storage Cell feeds power to the Device Electronics 22 through ammeters A[S] 55 and A[D] 57. Voltmeter V[RF] 54 measures the voltage at the smoothed output of the rectenna 51, voltmeter V[S] 56 measures the voltage across the Storage Cell 52, and voltmeter V[D] 58 measures the voltage across the Device Electronics 22.

Preferentially, each of these six measurements is taken contemporaneously enough to minimize errors due to time delays between related, fluctuating voltage and current readings when they are multiplied together.

Once these six Raw Metrics measurements have been taken, calculations are executed to obtain the Battery Need Metrics. First, DrainRate is calculated as:

$$\text{DrainRate}=A[D]$$

ReceivedPower can be derived by multiplying the voltage and current coming from the Rectenna as follows:

$$\text{ReceivedPower}=W[RF]=V[RF]*A[RF]$$

The third Battery Need Metric—StateOfCharge—is a numerical percentage of total storage device capacity. This metric can be measured in multiple ways.

In the first way, StateOfCharge can be derived by observing the slightly-varying voltage of the storage device and using a lookup-table to find the SOC value:

$$\text{StateOfCharge}\sim=f\{V[S]\}$$

In a second way, StateOfCharge can be determined by continually summing the instantaneous currents supplied to (or removed from) the storage device and applying appropriate correction factors. This is known in the art as "Coulomb counting":

$$\text{StateOfCharge}\sim=g\{\text{Sum}(A[S])\}$$

Both of the first two methods of measuring StateOfCharge have well-known difficulties, which are the subject of continuing research and refinements. In either case, the StateOfCharge is transformed into a unit-less number—a percentage of the entire charge capacity of the device.

If the A[S] measurement is not provided, one of the drawbacks of having only V[S] is that a lookup table provides accurate values only for "no-load" conditions, after the battery has had a period of rest. With the additional ammeter, the second formula (StateOfCharge$\sim=g\{\text{Sum}(A[RF]-A[D])\}$) can be replaced by the following formula: StateOfCharge$\sim=h\{\text{Sum}(V[S]*A[S])\}$ Note that the function g{ } provides Amperes, and the function h{ } Watts or Watt*seconds—dependent on how h{ } is calculated.

In addition to the continuously varying Battery Need Metrics, some embodiments of this invention also make use of slower varying metrics. These latter metrics include storage capacity and maximum charge rate (the "Battery Rating Metrics").

The storage capacity ("StorageCapacity") of a battery concerns the maximum charge the battery can hold. This metric is used to compute StateOfCharge of the battery. StateOfCharge can be expressed as a percentage of StorageCapacity. StorageCapacity is typically measured in Ampere*Hours. Attempts to charge a battery beyond the rated StorageCapacity usually generate heat, and in some cases damage the battery.

In addition to storage capacity, batteries have a maximum charge rate ("MaxChargeRate"), which is a measure of how fast the battery can assimilate charge. Pushing too much energy into a battery over too short a time frame can damage the battery. MaxChargeRate can be measured in Watt*seconds (Joules) per second, which is equivalent to Watts (i.e. W*s/s=W).

StorageCapacity vary widely among batteries. Moreover, batteries are typically rated with a static StorageCapacity. These rates are calculated and published by the manufacturers of the batteries. Manufacturers typically publish graphs showing how these readings decline over time.

As with StorageCapacity, MaxChargeRate is typically expressed as a static rating of the battery, with manufacturers providing data sheets showing how this rating typically declines over time.

One embodiment of this invention uses these manufacturer-provided static ratings of StorageCapacity and MaxChargeRate.

However, one preferred embodiment calculates the Battery Rating Metrics directly. This is because the actual performance of batteries on these metrics can vary from the static rating due to inefficient recharging practices. But this variance (usually a reduction) in battery performance typically occurs over a time-frame much longer than seconds (e.g. weeks, months, and even years).

Today, measurements for the Battery Rating Metrics are generally not taken on storage devices found in equipment being used.

Figure 6:
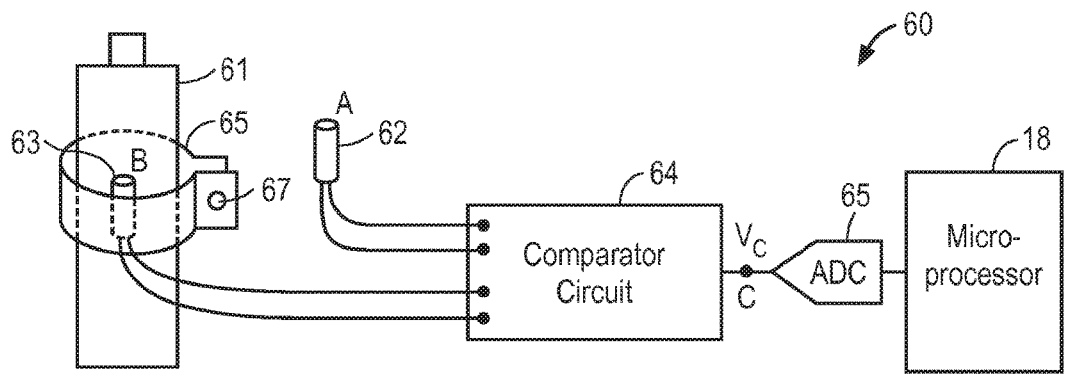
FIG. 6 depicts a circuit configured to detect if the battery is over charged.

A direct way to detect when MaxChargeRate is exceeded can be useful. FIG. 6 depicts an electronic circuit 60 that can be configured to detect when MaxChargeRate of a battery 61 is exceeded. Two thermistors A 62 and B 63 are employed. The thermistor is a type of resistor the resistance of which varies significantly with temperature, more so than with standard resistors. Thermistors are widely used as current-limiting devices for circuit protection.

The thermistor A 62 is exposed to ambient temperature, while the thermistor B 63 is in close contact with the battery 61. When the battery 61 heats up because it is being overcharged, the heat produced, would change the resistance of thermistor B 63 and hence change the resulting voltage across B 63. A comparator circuit 64 detects the difference in the resulting voltages across the thermistors A 62 and B 63 and generates an analog voltage $V_C$ at point C which is fed to an ADC 65 to digitize the analog voltage output $V_C$ of the comparator circuit 64. The digitized signal is then fed to a microprocessor 18. To ensure that the thermistor B 63 is in close contact with the battery 61, a cylindrical clamp 66 can be used to hold the thermistor B 63 against the battery 61. A blot 67 can be used to tighten the clamp 66 around the battery 61.

A binary value "being overcharged" is ambiguous: either meaning "MaxChargeRate being exceeded" or "Being charged to more than 100% StorageCapacity". However, both meanings are useful. (Batteries also overheat if they are discharged too quickly—but it is easy to determine if they are being charged or discharged by examining the sign of DrainRate—negative being charging, and positive being discharging.)

Once the Battery Need Metrics are measured and converted into digital representations, Momentary Battery Need can be calculated. Momentary Battery Need is a single metric representing current battery need.

Let function $f$ represent Momentary Battery Need, and variables s, d, and r represent StateOfCharge, DrainRate, and ReceivedPower, respectively. Then the function $f(s,d,r)$ is Momentary Battery Need.

Some constraints on the function $f(s,d,r)$ include the following: For two receivers, and for the same receiver over two measurements;

with equal d and r, $f$ is higher for the one with the lower s;

with equal d and s, $f$ is higher for the one with the lower r; and with equal r and s, $f$ is higher for the one with the higher d A practical alternative to the theoretical function $f$ is "Time to Die" ("TTD"). TTD is a measurement of the time predicted for which the storage device will continue to provide energy at present levels. After that time, the storage device is predicted to exhaust all the energy it has stored. At that time, the dependent electronic device no longer receives energy, so it will cease to function (or in the vernacular, "die").

In calculating TTD, the intent is to take the remaining charge of the storage cell (or battery) ("RemainingCharge") and divide it by the DrainRate, and thereby obtain the time period before which exhaustion occurs, the TTD:

$$TTD=RemainingCharge(As)/DrainRate=A*s/A=s$$

RemainingCharge is computed from StateOfCharge (a percentage) and StorageCapacity, typically measured in Ampere Hours (A*h or Ah), and easily convertible to Ampere Seconds (A*s or As):

$$RemainingCharge(As)=StateOfCharge\ (\%)*StorageCapacity(Ah)*3600$$

Accordingly, the TTD parameter estimates the number of seconds the storage device can support the present power draw level.

Over time, multiple readings of TTD for each receiver satisfy the same constraints on the negative of function $f$ (i.e. $-f$) as described above.

For another example of calculating Momentary Battery Need, any of the three Battery Need Metrics can serve as a rough estimate. That is, Momentary Battery Need could equal StateOfCharge, DrainRate, or ReceivedPower.

One reason for using any of the foregoing Battery Need Metrics instead of TTD is to simplify the measuring electronic circuitry required within the receiver.

Under one embodiment of this invention, different receivers can employ different battery need measurements. Some receivers might employ TTD, others one of the Battery Need Metrics, and still others, might use another variant based on the Battery Need Metrics.

Momentary Battery Need can provide an inaccurate reading of true need. This is because, from moment to moment, Momentary Battery Need can vary significantly.

Accordingly, a preferred embodiment of this invention calculates a Smoothed Battery Need that is a calculation based on multiple readings of Momentary Battery Need.

For example a MovingAverage can smooth fluctuating Momentary Battery Need readings out and provide a Smoothed Battery Need. An example smoothing algorithm for MovingAverage can be expressed as a series of steps to calculate the smoothed result for each successive reading:

Total=Total−Reading(This)

Reading(This)=NewReading

Total=Total+Reading(This)

This=Next(This)

Return (Total/Count)

This presumes that "Count" contains the number of items in the moving average range; that the first "Count" generated results are discarded; and that the "Next" function is aware of "Count" and sets "This" back to the start of the "Reading" array after "This" reaches the end of the "Reading" array.

In the example above, Return (Total/Count) equals Momentary Battery Need. e.g., Momentary TTD. So the value returned by the algorithm is Smoothed Battery Need. e.g., Smoothed TTD.

The foregoing describes only one smoothing function. But many alternative smoothing functions are known in the art. This invention can use any such smoothing function.

Another consideration in measuring true battery need is that a history of battery drain rates for a receiver can be useful for predicting the future need. With this approach, the immediate prior "Return (Total/Count)" readings like that used for calculating Smoothed Battery Need is not enough. For predicting battery need, the prior readings preferentially can span weeks or months, not merely seconds or minutes, in order to discern useful patterns.

Historical data for a receiver is preferentially stored in that receiver. This is because if that receiver's history is kept in the wireless power transmitter serving it, then that transmitter will have only partial records of its history available if the receiver moves among different transmitters over the course of days (e.g., a mobile phone moving from home to the car to an office to a restaurant back to the office back to the car back to home, with some or all of those locales hosting a transmitter that charges the phone).

The tune to start predicting the future is the moment when wireless power becomes available to the receiver again. A wireless power "Session" is the duration between the time when wireless power becomes available to a receiver, and the next time wireless power becomes available—including the intervening time when wireless power was not available. The Session starts when power becomes available to fulfill a predicted need, and the prediction calculation should be started concurrently.

For each Session, "Session Data" is collected characterizing the Session. An example of such data is below:

| Session Data | |
| --- | --- |
| StartTimeStamp | HHMMSS |
| DayOfWeek | 1-7 |
| SessionDuration | seconds |
| PowerAvailableDuration | seconds |
| ReceivedPowerLevelAverage | W |
| TotalEnergyDrain | Ws |

StartTimeStamp is the start of the Session. DayOfTheWeek is the day on which the Session StartTimeStamp started. SessionDuration is the length of time during which the Session lasted.

PowerAvailableDuration is the length of time during which ReceivedPower (V[RF]*A[RF]) is greater than zero.

ReceivedPowerLevelAverage is the average of ReceivedPower during the Session. This is computed by summing, over the Session, periodic recordings of ReceivedPower into ReceivedPowerLevel, and dividing the latter by PowerAvailableDuration.

TotalEnergyDrain is the accumulated sum of DrainRate (V[D]*A[D]) multiplied by the SessionDuration yielding WattSeconds (Ws).

After a sufficient number of "Session Data" records have been accumulated, it will be possible to find Session Data records with StartTimeStamp values that are near the present system time when the prediction needs to be made. All records matching that criterion can have averages, medians, or means (or other statistical parameters) calculated (possibly by taking into account DayOfWeek) in order to provide the following parameters:

| | |
| --- | --- |
| TypicalSessionDuration | seconds |
| TypicalPowerAvailableDuration | seconds |
| TypicalReceivedPowerLevelAverage | W |
| TypicalTotalEnergyDrain | Ws (for the entire session) |

These parameter names starting with "Typical" are used to predict the future based on past conditions. These parameters (and possibly others) are used to derive useful metrics:
PredictedEnergyNeed (Ws)=TypicalTotalEnergyDrain (Ws)
PredictedEnergyReceived (Ws)=TypicalReceivedPowerLevelAverage (W)*TypicalPowerAvailableDuration (s)

These metrics can be used to calculate how many seconds the receiver needs to stay where it can receive wireless power. With suitable calculations, predictions based on earlier similar sessions could allow the transmitter to email the receiver a warning. An example of the warning can be:

You may be planning to leave an area providing wireless power earlier than recommended. Your iPhone's power is predicted to last until about 10 PM with your typical usage. If you can remain and draw more wireless power for 9 more minutes, you can extend this time to 11 PM. Sent from your wireless power cell.

This email could be generated in this way:

```
TOD is Time Of Day
    AdditionalEnergyNeed (Ws) = PredictedEnergyNeed (Ws) −
                                PredictedEnergyReceived (Ws)
    If AdditionalEnergyNeed > 0 Then
        Battery Energy (Ws) = StateOfCharge(%) * StorageCapacity
        (Ws)
        PredictedNoPowerDuration (s) = TypicalSessionDuration (s) −
                                TypicalPowerAvailableDuration (s)
        PredictedFinalPowerDraw     TypicalTotalEnergyDrain
        (W) =                       (Ws) /
                                    PredictedNoPowerDuration
                                    (s)
        (W) =5 BatteryRemainingSeconds (s) = BatteryEnergy (Ws) /
                                    PredictedFinalPowerDraw (W)
        WhenBatteryDies (TOD) = NowTimeStamp (TOD) +
                                BatteryRemainingSeconds
        AdditionalTimeNeeded = AdditionalEnergyNeed /
                                TypicalReceivedPowerAverage
        ExtendedTime (TOD) = StartTimeStamp +
        TypicalSessionDuration
        Email( userID, WhenBatteryDies, AdditionalTimeNeed,
                    ExtendedTime);
    End If
```

BatteryRemainingSeconds can be used to serve as the value for Predicted TTD.

The foregoing discussion covered methods for measuring battery need. In one embodiment of this invention, the only aspect of these methods that must be performed in the receiver are the electronic circuits for measuring the need metrics.

For example, the electronic circuitry discussed for measuring each of StateOfCharge, DrainRate, and ReceivedPower would be located in the receiver. Similarly, the single circuit disclosed for measuring the Raw Metrics (V[RF], A[RF], V[S], A[S], V[D], and A[D]) would be located in the receiver.

But either the receiver or the transmitter can calculate Momentary Battery Need, Smoothed Battery Need, or Predicted Battery Need.

Moreover, in the case of a plurality of receivers, different receivers can calculate different need measurements. For example, one receiver might measure one of the Raw Metrics, Battery Need Metrics, Momentary Battery Need, Smoothed Battery Need, and Predicted Battery Need (collectively, "Battery Need"). Other receivers might measure other ways of assessing Battery Need.

Once the receiver has calculated Battery Need, the next step is for the receiver to communicate this information to the transmitter.

In one embodiment of this invention, this battery need information is encoded in a digital form, and transmitted wirelessly in a data packet by the receiver to the transmitter.

The representation of numbers in various bit and byte schemes has decades of history. Generally, for numbers that will be used with mathematical functions, it is necessary to know the range of the numbers that will be encountered, and the accuracy desired for them. The number of bits used in the encoding scheme affects both of these attributes.

The receiver generates and transmits a Battery Need Packet. This packet contains information on the Battery Need of the receiver.

The Battery Need Packet is preceded by 1) a header containing start bytes, 2) a Receiver ID to identify which receiver is sending the data, and 3) a Message Type that indicates the Battery Need formula for the packetized information.

In one embodiment, the packetized information is encrypted into a byte stream, and a modulator clocks the bytes out to the radio transmitter. The entire message is rendered as one series of bits.

One embodiment encodes the packet headers as follows:

Start bytes. These are a specific, unalterable series of bytes unlikely to appear in real data. This allows an input scanner to continually looking for this sequence of bytes and thereby recognize the beginning of a data transmission. The number of bytes varies depending upon the implementation, but is often in excess of 8 bytes.

Receiver ID bytes. This byte is assigned by the transmitter when the receiver introduces itself.

Message Type: These bytes disclose the particular encoding scheme used in the data section of the message. Two bytes would provide for well over fifty thousand message types, again a more than adequate provision. In an embodiment in which different receivers measure Battery Need in different ways, Message Type also indicates which Battery Need formula was used (e.g., Smoothed StorageCapacity).

In one embodiment, the data portion of the Battery Need Packet contains one or more of the three Battery Need Metrics.

ReceivedPower. For numbers relating to measurements appropriate for ReceivedPower, we can expect a range of approximately 5 milli Watts (mW) to 5 Watts, or a range of about 1000. The accuracy the transmitter needs could tolerate being as far off as about 10 mW, so three significant digits will be enough. If the measurements are encoded in 10 bits, the result is three significant decimal digits, and 1024 unique values. Adding more bits can increase accuracy or range, or both, so representing ReceivedPower measurements with 16 bit signed integers is more than adequate, providing a range of values wider than −32 W through +32 W in 1 mW steps.

StateOfCharge. Due to the difficulties in deriving an accurate StateOfCharge value from battery voltage, the transmitter could get by with a range of just 10 values, and 1 significant digit. In other words, a "Percent of Full Charge" range running from approximately 10% to 100% in 10% steps is state-of-the-art. This requires less than 4 bits of information.

DrainRate. Numbers for DrainRate are likely in the range of approximately 0-500 mA, and need not be more accurate than discrete steps of about 1 mA. This is an approximate range of 500 values and an accuracy of less than 3 significant digits. This requires less than 9 bits of information.

In an embodiment, the receiver encodes all three of the foregoing metrics. Once digitally encoded, the data is now packetized.

In one packetizing approach, 2 bytes is allocated to each of the three Battery Need Metrics as follows:

| Received Power | 2 bytes |
| State of Charge | 2 bytes |
| Drain Rate | 2 bytes |

These add up to 6 bytes total for the Battery Need information data packet.

In an alternative packetizing approach, the three Battery Need Metrics are represented in their minimal bit patterns:

| Received Power | 10 bits |
| State of Charge | 4 bits |
| Drain Rate | 9 bits |
| Total | 23 bits (or nearly 3 bytes). |

The advantage of the second approach is a 50% reduction in data payload size. The disadvantage of this approach is slower computation at the transmitter since the transmitter needs first to decode the 3 bytes into the three metrics. No such decoding step is needed with the 6-byte packet approach.

In another embodiment of this invention, the receiver encodes and packetizes the Raw Metrics rather than the higher-order Battery Need Metrics.

The voltages of the Raw Metrics will not, approximately, range as far as +/−30 volts, and resolving to the nearest millivolt is adequate. Therefore, 2-byte signed integers can be scaled to read from −32.767 volts to +32.767 volts in one-millivolt steps.

The Raw Metrics currents will not, approximately, range as far as +/−3 amps, and resolving to the nearest 100 microamps is adequate. Therefore, 2-byte signed integers can be scaled to read from −3.2767 amps to +3.2767 amps volts in one-hundred-microamp steps.

Accordingly, for the six Raw Metrics (three for voltage and three for current), allocating 12 bytes is sufficient.

The packets that result from the Raw Metrics can be structured as follows:

| Header | |
| --- | --- |
| Start Bytes | 2 bytes 16 bits |
| Receiver ID | 1 byte 8 bits |
| Message Type | 2 bytes 16 bits |
| Data | |
| V[RF] | 2 bytes 16 bits |
| A[RF] | 2 bytes 16 bits |
| V[S] | 2 bytes 16 bits |
| A[S] | 2 bytes 16 bits |

| | |
|---|---|
| V[D] | 2 bytes 16 bits |
| A[D] | 2 bytes 16 bits |
| Total | 17 bytes 136 bits |

The tradeoff between packetizing Battery Need Metrics versus Raw Metrics concerns packet size (the greater the size, the greater the transmission time) versus computing cycles (the greater the computations, the higher the load). Packetizing Battery Need Metrics saves on bytes transmitted, but pushes the calculations down to the receiver. The reverse is the case with packetizing the Raw Metrics.

The Battery Rating Metrics (MaxChargeRate and StorageCapacity) are useful for computing battery need. But the values of these parameters tend to change relatively slowly, so it would be wasteful for the receiver to transmit these values as often as the fluctuating battery need values are transmitted.

The Battery Rating Metrics reduce slowly over months and years of use. As described above, these parameters may be periodically re-calculated on the basis of careful receiver measurements or by using a simple approximation, for example a straight-line prediction based on calendar date.

A minimal Battery Rating Packet will contain these values:

| Header | |
|---|---|
| Start Bytes | 2 bytes |
| Receiver ID | 1 byte |
| Message Type | 2 bytes |
| Data | |
| MaxChargeRate | 2 bytes [0 . . . 65535] mW |
| StorageCapacity | 2 bytes [0 . . . 65535] Wh |

Battery Rating Packets are sent to accommodate rare but important updates to these values. However, since these are rare packets, loading these special packets up with many fields can permit one multiple-use packet to serve more than one purpose.

For example, periodic Battery Rating Packets could also contain many other parameters about the receiver:

| DeviceID | specific device, perhaps a serial number |
|---|---|
| Manuf | manufacturer's name |
| Part# | part number or SKU |
| Lot | lot number for tracking purposes |
| Revision | hardware/software revision level |
| MAC | special number for communications |
| DeviceType | CellPhone |
| BatteryType | Part# |
| MaxChargeRate | 2 bytes 0 . . . 65535 mW |
| StorageCapacity | 2 bytes 0 . . . 65535 Wh |

The receiver sends Battery Need Packets wirelessly to the transmitter. To do so, the receiver either uses a side-channel, or appends the packet to a beacon signal.

In a preferred embodiment, the receiver generates a beacon signal. The purpose of this signal is for the receiver to announce its presence to the transmitter.

The beacon signal has many tight constraints on its timing, duration, and repetition rate. Every bit of data added to the length of the beacon signal takes away from the time available for transmission of wireless power from the transmitter. Therefore, the smallest possible amount of data should be included with the ID portion of the beacon signal. In one embodiment, the beacon is designed with minimal start bytes and no message type or data portion. A side-channel is used for the latter.

In yet another preferred embodiment, a side-channel is used for the entire Battery Need Packet. In an alternate embodiment, the Battery Need Packet is sent with each beacon.

Battery Need Packets sent as a preamble to the beacon would be sent out every time the beacon is sent. In a preferred embodiment, this frequency can be approximately 10 milliseconds.

Packets sent out on a side channel have no beacon constraints, and could be sent at any frequency, including continuously—especially if the frequency were altered from the frequency used by the transmitter to deliver wireless power to the receiver.

As noted earlier, Battery Rating Packets are sent at a much lower frequency than the Battery Need Packets (measured in seconds).

In one embodiment, the receivers send a BatteryFull message to the wireless power transmitter when full. This is an indication that the receiver has no more need of the transmitter at that time, and wishes not to burden the transmitter with further Battery Need Packets until such need exists.

In another embodiment, when its battery is full, the receiver simply stops all communications to the transmitter. Then transmitter would then presume the receiver had left the area.

In both embodiments, when the receiver becomes aware of the need for more wireless power, it could pursue the normal introduction process that all receivers must undertake when brought into the presence of a transmitter. Following this, the receiver would resume sending Battery Need Packets as described herein.

With a plurality of receivers wirelessly sending Battery Need Packets, the next step is for the transmitter to receive these packets.

The transmitter has at least one central collection point for receiving Battery Need Packets. This is a data controller within (or associated with) the transmitter. It receives the wireless Battery Need Packets from none, one, or multiple receivers.

In a typical installation, there can be multiple wireless power receivers near at least one wireless power transmitter. Many receivers can then transmit Battery Need Packets to the data controller.

Cross-interference between their multiple un-coordinated transmissions must be prevented. The packets can be coordinated by having the wireless power transmitter poll each receiver for the Battery Need Packet. Alternatively, multiple many-to-one messaging schemes are well known in the art of data communications, for example CSMA-CD.

Generically, a radio transceiver in the data controller will be communicating with the receivers. The transceiver receives data line and present signals to be resolved into bits by a data detector, possibly run through decryption circuitry, which exit as a stream of bytes. These bytes are shifted into a data input channel on a processor looking for a specific series of bytes that make up the beginning of a data block header.

Typically, as discussed earlier, the header includes details like Media Access Control bytes (MAC addresses) or a Receiver ID, so the controller knows which receiver sent the message. A final header byte typically codes the message type. Once this is found in the data stream, the remaining bytes take on meaning according to a protocol that lays out what the bits mean in that particular message type.

This packet unraveling approach is typical of many protocols, and there are numerous examples in the art.

Once the message types are identified, the specific data parameters that those messages are designed to send can be recovered from the data stream.

Using Message Type from the packet header, the data controller can extract the specific encoded Battery Need (e.g. Raw Metrics or Battery Need Metrics, Momentary, Smoothed, or Predicted).

With the abundance of message types comes the possibility of varieties of message types that are similar to one another, or that contain similar kinds of data, but with different encodings, different high-level meanings, or with different purposes.

The data controller must normalize this variable data into a common need format. In a preferred embodiment, this common need format is TTD.

In one embodiment, all receivers transmit the Raw Metrics in the same way, and with the same encoding, at all times, using the same message type. In this case, TTD can be calculated from these readings using the formulas described earlier.

In another embodiment, different message types could transmit the same essential data, but with different encodings or higher-level meanings for the raw data represented at the low level by the Raw Metrics. An example would be all receivers using the same function (e.g. TTD) for battery need, but some receivers sending the Raw Metrics, others send the Battery Need Metrics, and still others send TTD.

In this case, each receiver is sending complete information for calculating the value of TTD. For Battery Need Packets containing TTD, no further processing is needed. For packets containing the Battery Need Metrics, then TTD is calculated using the functions described earlier. For packets containing the Raw Metrics, the formulas described earlier are used for transforming these values into the Battery Need Metrics. Then the TTD function is applied to calculate the value of TTD.

In a third embodiment, different Receivers use incompatible groups of measurements or implement special features that depend upon unique capabilities of custom receiver hardware or software. In these cases, there will have to be some means of normalizing the data.

For example, for a receiver that measures and communicates only DrainRate or StateOfCharge, the transmitter will need to make assumptions about the missing data in order to normalize those measurements into TTD. These assumptions can be drawn from manufacturer data about the typical performance of the receiver battery.

With the Battery Need Packets received and normalized into common readings (preferentially TTD), the transmitter is ready to satisfy these need requests optimally.

With this invention, any kind of wireless power transmission approach can be used, including:
- phased microwave array like that developed by Omni-Lectric, Inc.;
- ultrasound like that developed by UBeam;
- magnetic resonance like that developed by Witricity;
- infrared laser like that developed by PowerBeam;
- ambient energy harvesting like that developed by PowerCast; and
- any other wireless power transmission technology.

The reason that this invention applies to all wireless transmission technologies is that all such technologies are capable of delivering power via pulses. It may be that some of these technologies are constrained in choice of pulse modification approach (e.g. frequency modification instead of phase or time or directed transmitter).

But this invention applies to all means of generating at least two pulses of wireless power, each pulse being sent to one of two receivers located in different places.

However, the preferred embodiment, discussed next, employs phased microwave array technology in the transmitter (as is described by Omnilectric in U.S. Pat. No. 8,159,364), using phase focused pulsing.

The ability to direct the power from multiple antennae of a phased array to a single receiver has many advantages. One advantage discussed here is that of being able to direct specific amounts of power to different receivers based upon their needs.

It is well known in the art that electrical power can be sent as a series of pulses. These power pulses are collected and smoothed by one electronic circuit to provide a constant source of power to another electronic circuit.

By sending individual power pulses to different circuits that smooth the pulses, power from one source can be distributed to multiple destination circuits.

Proper pulse allocation is accomplished by sending the optimal number of pulses to each individual receiver. Each receiver gathers power from the pulses that are sent to it, and thereby obtains the necessary power to use as needed.

When differing power requirements must be satisfied, each receiver can be targeted with sufficient power pulses to meet that receiver's specific requirements. If all power pulses are the same size, receivers needing more power (e.g. ones with a lower TTD) can receive more pulses, while receivers needing less power (e.g. a higher TTD) can receive fewer pulses. Other schemes can be employed if, for example, the power pulses are of different sizes (e.g. individual pulses can be expressed as multiples of the smallest pulse).

At the transmitter, before pulse allocations can be calculated, the power needs of every receiver in the group of receivers must be known.

This information comes from the receivers themselves, and the collected information permits calculation of the total power to be delivered as well as the pulse allocations.

Now that the transmitter has collected what each of the receivers would wish to receive, it needs to distribute the pulses.

Figure 7:
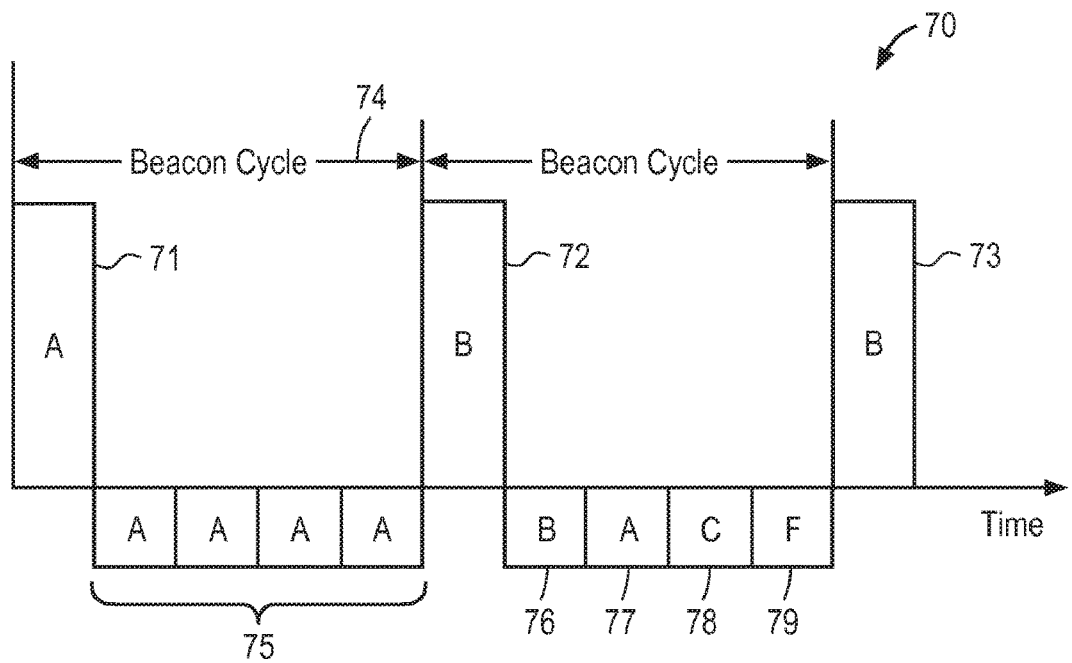
FIG. 7 depicts a sequence of pulses for a transmitter communicating with multiple receivers.

FIG. 7 shows an exemplary scheme 70 where the transmitter is configured to communicate with four receivers, A, B, C, and F. The receiver A is sending a beacon pulse 71, followed by receiver B sending two beacon pulses 72 and 73. Per each beacon cycle 74, the transmitter sends 4 pulses to these receivers. For the first beacon 71, sent by A, there are no other receivers expressing battery need, so A receives all 4 pulses 75. For the second beacon 72, sent by B, all four receivers are expressing roughly equal battery need. So the transmitter sends four power pulses 76, 77, 78, and 79, to the four receivers, B A, C, and F, respectively. One power pulse goes to each of the four receivers.

In one embodiment, the transmitter sends, for example, 100 pulses per beacon cycle. The transmitter allocates these 100 pulses among receivers. The number of pulses sent to each of these receivers can be calculated as follows:

$$\text{\# pulses allocated to receiver } i = \text{round}((\text{need of receiver } i/\text{total need of all receivers})*100)$$

Where need is expressed as TTD, a different allocating function is needed. For example:

```
FUNCTION: TTD2PULSE
    CONVERT LIST OF TTD VALUES TO LIST OF PULSE COUNTS
    GIVEN INPUT ARRAY = TTD[1..N]
        CALCULATE OUTPUT ARRAY = NUMPULSES[1..N]
        NORMALIZE = SUM( TTD[1..N] )
        WEIGHT[1..N] = NORMALIZE / TTD[1..N]
        WEIGHTSUM = SUM( WEIGHT[1..N] )
        PULSEFACTOR = WEIGHTSUM / MAXPULSES
        NUMPULSES[1..N] = WEIGHT[1..N] * PULSEFACTOR
ALTERNATE LAST LINE:
        NUNPULSES[1...N] = MAX( 1, WEIGHT[1..N] *
        PULSEFACTOR )
```

This method allocates the pulses among the receivers according to their respective battery needs expressed as TTD.

The foregoing two allocation schemes are merely examples. This invention addresses any other approach to allocating available pulses to the receivers according to the respective battery needs of the receivers.

The wireless power data controller and transmitter coordinate with multiple receivers to deliver power to them. The following section discusses one embodiment of a transmitter interacting with none, one or two receivers according to this invention.

Receivers are able to detect when they get power bursts from the transmitter. Each power burst contains multiple power pulses. Each pulse can be directed to one among multiple receivers. One preferred embodiment has, for example, 100 power pulses per burst, but any ratio is acceptable under this invention.

Figure 8:
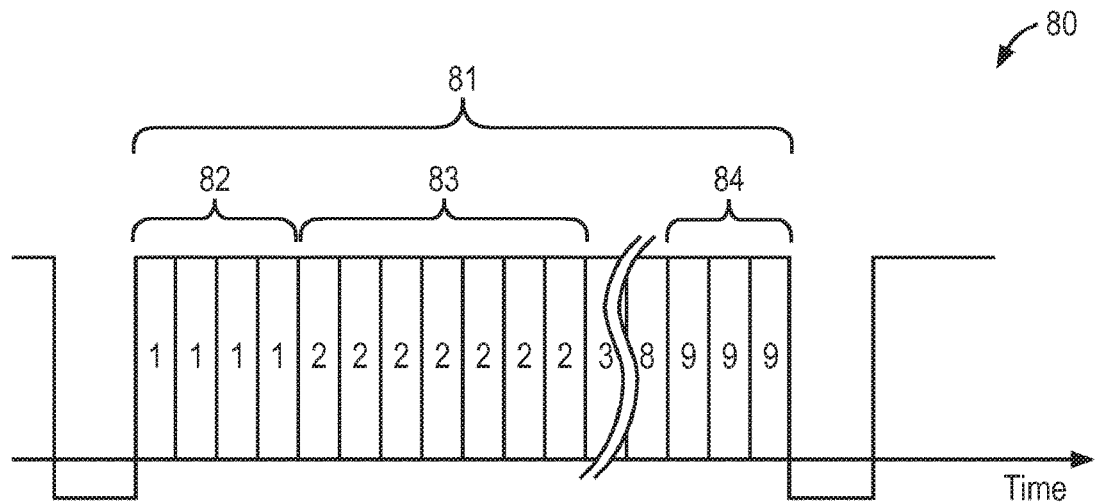
FIG. 8 shows a sequence of power pulses forming a power burst.

FIG. 8 shows a power burst 81 comprising of a large number of power pulses in the burst, say 100. We will consider, for example, 26 of these power pulses feeding 9 receivers. Receiver #1 receives 4 power pulses 82, Receiver #2 receives 7 pulses 83, and Receiver #9 receives 3 pulses 84. As has been described, this discrepancy of pulse allocation among the receivers is due to the different degree of Battery Needs of each receiver.

The power pulses contain energy directed to a specific receiver, but not every power burst needs to contain power pulses for every active receiver. In other words, a particular receiver can be left out of a power burst by not having any power pulses allocated to it within that particular burst.

The transmitter uses a side channel to communicate beacon requests to the receivers. These requests ask the receivers to identify themselves and to begin declaring their need for power.

All receivers within the transmitter range will receive all beacon requests. But each beacon request is directed exclusively to a single receiver. This is accomplished by using a unique Receiver ID in the message. Each receiver within range examines whether a particular beacon request is addressed to it or not.

If there are two receivers requesting power at the same time, conflicts need to be avoided. This is accomplished by having each receiver disregard one beacon request and respond to the next. For example, with two receivers, one receiver can skip the even requests, while the other receiver skips the odd requests.

In the examples below, it is assumed that the receivers are sending their respective Battery Need Packets as part of their beacons. As noted earlier, this approach is one embodiment of the invention. In other embodiments, a side channel on the receiver sends out the Battery Need Packets independent of the beacons.

Figure 9:
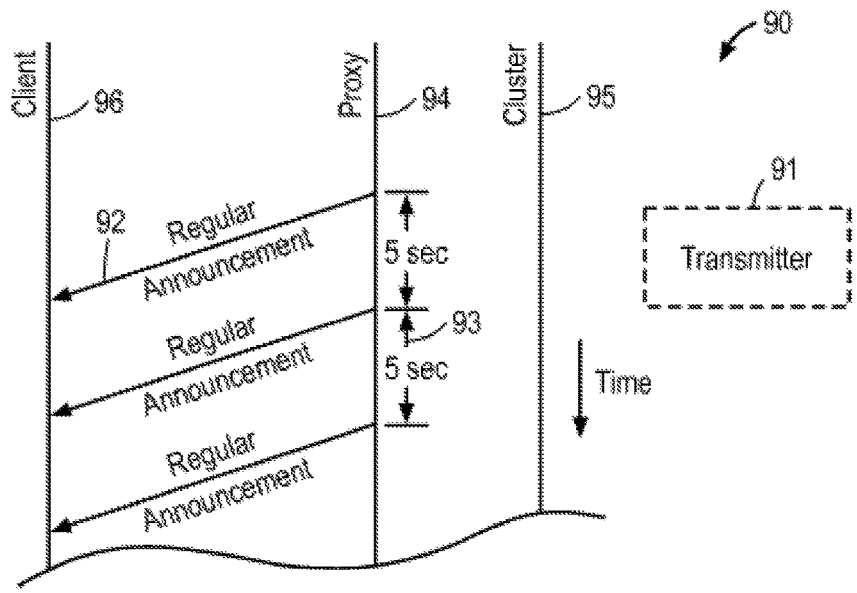
FIG. 9 shows an example of a transmitter-receiver communication scheme, in which no receivers are detected by the transmitter.

Let us consider first a simple case where there are no receivers nearby a transmitter. A simple corresponding scheme 90 for this case is depicted in FIG. 9. A lone wireless power transmitter 91 broadcasts a series of general announcements (the "Regular Announcement") 92 at time intervals 93 (e.g. five-second time intervals). Expecting that it will eventually discover a nearby receiver, the transmitter sends a Regular Announcement 92 from a single antenna 94, called "Proxy". The special antenna Proxy 94 is part of a cluster of antennae 95 in the transmitter 91. Regular Announcements 92 are to be received by potential receiver "Client" 96. The communication scheme 90, is considered as an example case where there are either no receivers present, or where present ones have no power to respond. In both cases, there are no returning signals from receivers.

Figure 10:
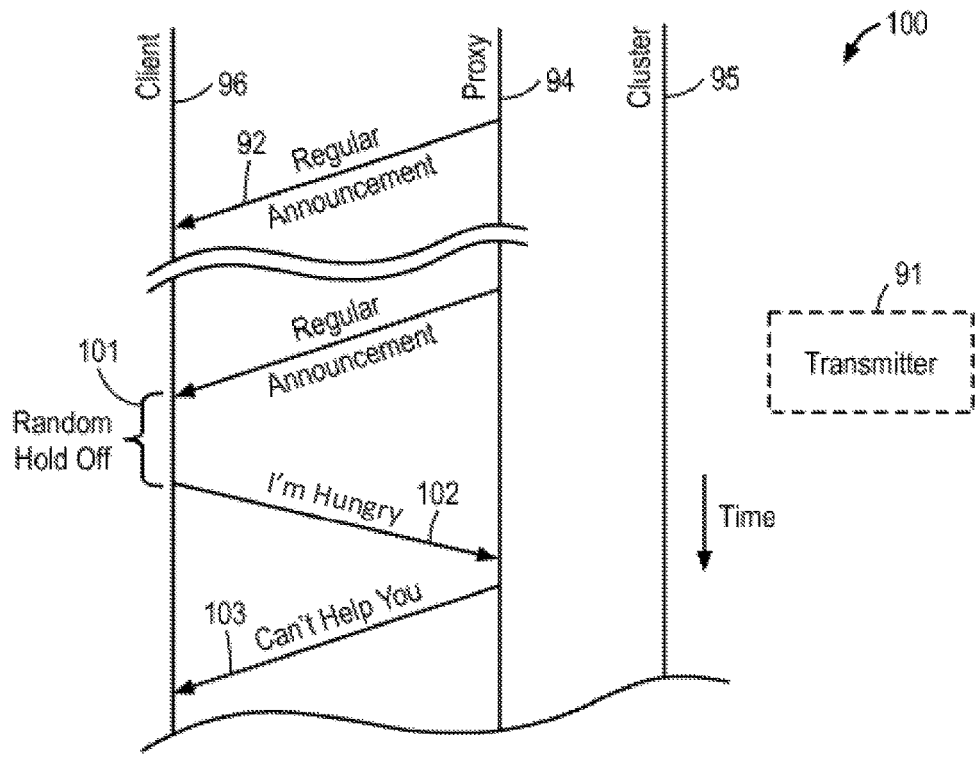
FIG. 10 shows an example of a transmitter-receiver communication scheme, in which one receiver is detected by the transmitter.

FIG. 10 shows another example of transmitter-receivers communication. In a communication scheme 100, a client receiver 96 finally does appear in the environment, it receives the "Regular Announcement" 92, waits a random amount of time, "Random Hold Off" 101, and then responds with an "I'm hungry" message 102. In this communication scheme 100, the transmitter determines from the contents of the "I'm hungry" message) that the sender is not authorized to receive power. In this case, the transmitter 91 replies with a "can't help you" message 103. The client receiver 96 receives this message and marks that transmitter and its configuration revision level as non-responsive. This prevents the client receiver 96 from needlessly contacting the transmitter 91 again, until it has been reconfigured. (A reconfiguration could be due to a new authorization for the receiver to receive power).

Figure 11:
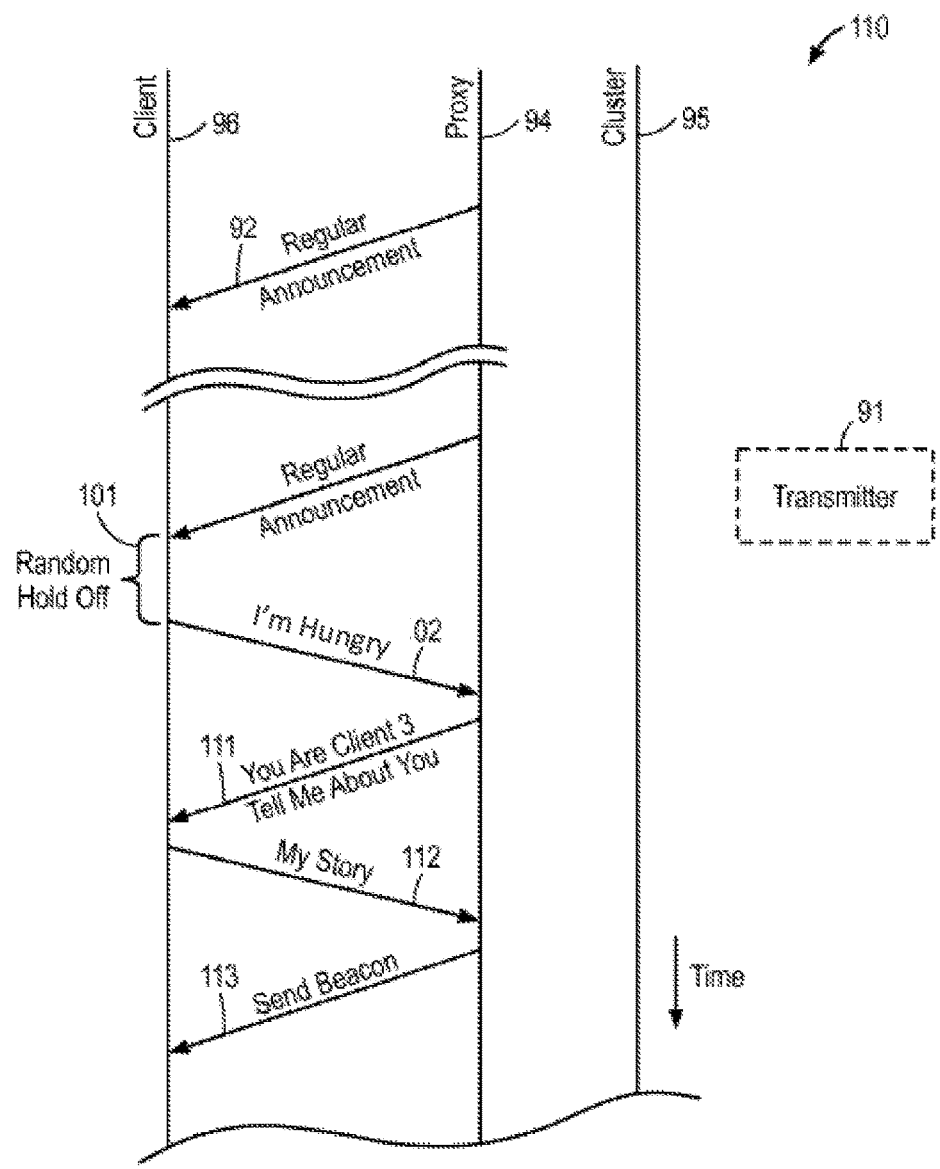
FIG. 11 shows an example of a transmitter-receiver communication scheme, in which the detected receiver by the transmitter is recognized as an authorized receiver.

FIG. 11 shows another example of transmitter-receivers communication. The communication scheme 110 depicts a successful introduction of a client receiver 96 into the transmitter's list of authorized receivers. As before, the receiver receives the "Regular Announcement" 92, waits a random amount of time, "Random Hold Off" 101, and responds with an "I'm hungry" message 102. With this receiver, the transmitter 91 determines that the receiver is, in fact, authorized to receive power. When this is the case, the transmitter 91 replies with a Receiver ID picked from a pool of available Receiver IDs. Once this Receiver ID is selected, (order is irrelevant, they simply must be different), it declares to the receiver that, for example in the communication scheme 110 shown in FIG. 11 "You are Client #3" 111.

The receiver receives this message and returns a "My Story" message 112. In one embodiment, this message is a Battery Rating Packet. This packet is compiled and sent by receivers only upon being assigned a Receiver ID by the transmitter 91.

Once the transmitter 91 receives this packet, it determines how to treat the receiver, and sends a "Send Beacon" message 113 to it.

Figure 12:
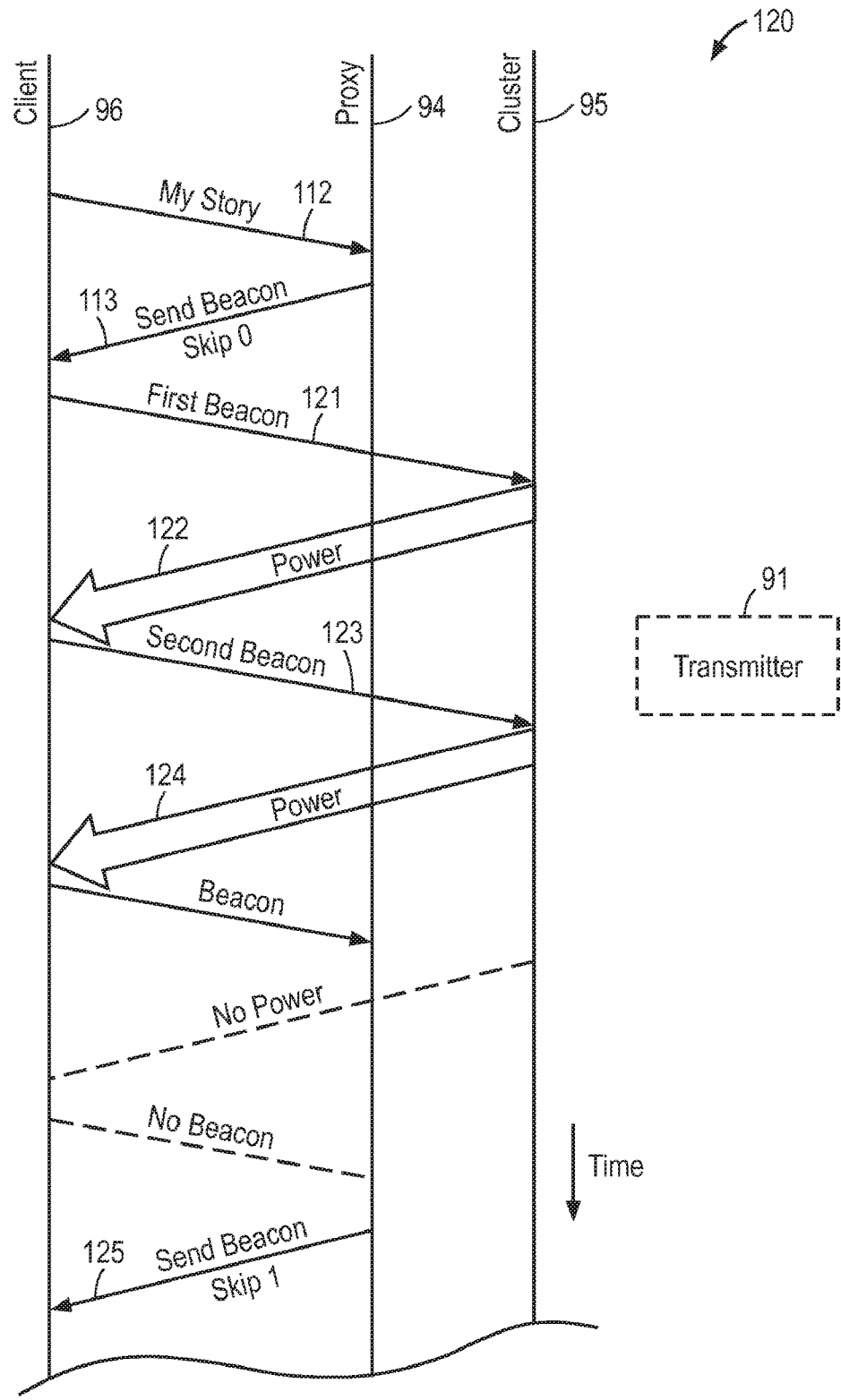
FIG. 12 shows an example of a transmitter-receiver communication scheme, in which the authorized receiver is receiving wireless power.

The exemplary communication scheme 120 shown in FIG. 12 describes a case where a successfully authorized client receiver 96 interacts with transmitter 91 that has no other receiver within reach.

Having received the transmitter's "Send Beacon" message 113, the client receiver 96 sends a first beacon 121. The first beacon 121 allows every antenna in the transmitter array to determine the exact phase angle of the receiver's signal at that antenna. This enables every antenna in the transmitter 91 to capture that phase information, and calculate a complex conjugate of the phase angles for each antenna in the cluster. Later, these phase angles can be used to transmit a single pulse of wireless power 122 from all those antennas back to that receiver.

The phase angles of all the returning transmissions from all the antenna elements have been arranged so they all peak as they travel through the location of the receiver's receiving antenna (and by design, nowhere else). This provides a pulse of power to the receiver, which has circuitry designed to harvest the energy and derive power from it.

Once the receiver detects that it has received one or more power pulses in a burst, it then sends out a second beacon 123, and later receives another power burst 124. This interaction continues until the transmitter 91 stops delivering power bursts.

Once a receiver in "Send Beacon" mode detects a missing power pulse, it waits for a different "Send Beacon" command 125 from the transmitter Proxy. The "Send Beacon" command 125 means "send one beacon" and it also has a skip factor. The skip factor commands the receiver to not respond to every power pulse with a beacon, but to skip some number of power pulses before sending a beacon.

Now, we consider the case of having at least two receivers waiting for beacon requests. In the communication example 130 shown in FIG. 13, the communication starts by the interaction between one transmitter 91 and one client receiver 131 called "A". Client receiver A, 131 has detected a power burst 132, and has sent a beacon signal 133 requesting another burst—with a 0 skip factor.

The transmitter 91 discovers it is time to send out another "Regular Announcement" 134. A second client receiver B 135 (for example Receiver #6) that receives the "Regular Announcement" 134 will delay a random amount of time, "Random Hold Off" 101 and then respond with a "I'm hungry" message 102 message to that request.

At this point, the transmitter 91 determines that the second client receiver B 135 is also authorized to receive power pulses. So, the wireless transmitter 91 picks another Receiver ID from the free Receiver ID pool and it uses the Proxy 93 to send a "You are Receiver #6" message 136.

During this time, client receiver A 131 sends a beacon message 133, expecting another power burst in response. Because the transmitter is setting up the second client receiver B 135, this beacon is ignored. The client receiver A 131 will notice the missing power burst and change modes. Instead of sending beacons without being asked, this new mode waits for beacon requests before sending them. The new mode will also skip a configurable number of beacon requests before responding.

Back at the second client receiver B 135 (Receiver #6) which has just received the "You are Receiver #6" message 136, it responds by providing its own "My Story" message 137. Once this packet from the second client receiver B 135 (Receiver #6) has been received, the wireless power transmitter 91 now has two active client receivers; client receiver A 131 and client receiver B 135 that need to be supplied with power, and both are waiting for beacon requests.

Figure 13:
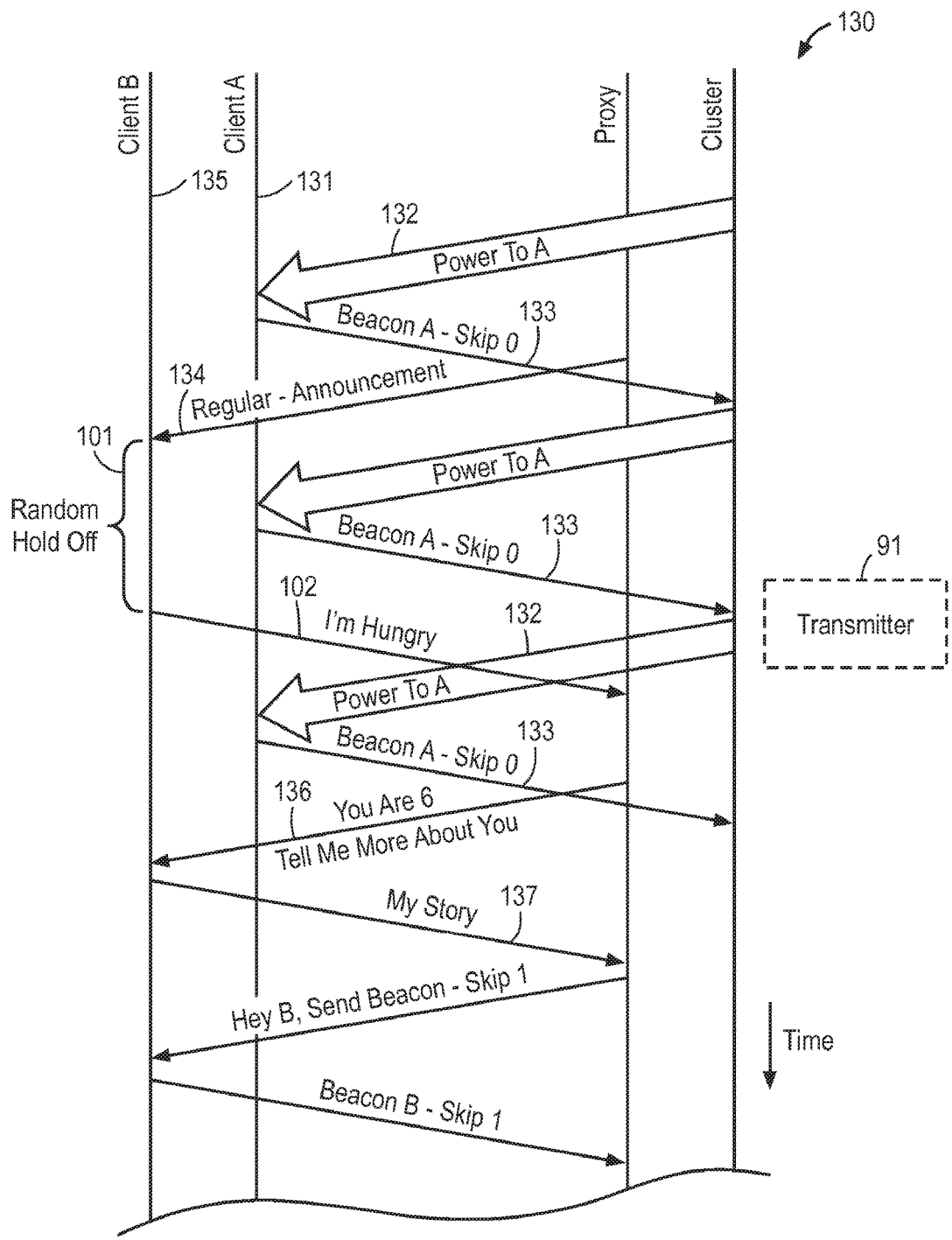
FIG. 13 depicts an example of a transmitter-receiver communication scheme, with the transmitter recognizing and supplying power to at least two receivers.
Figure 13:
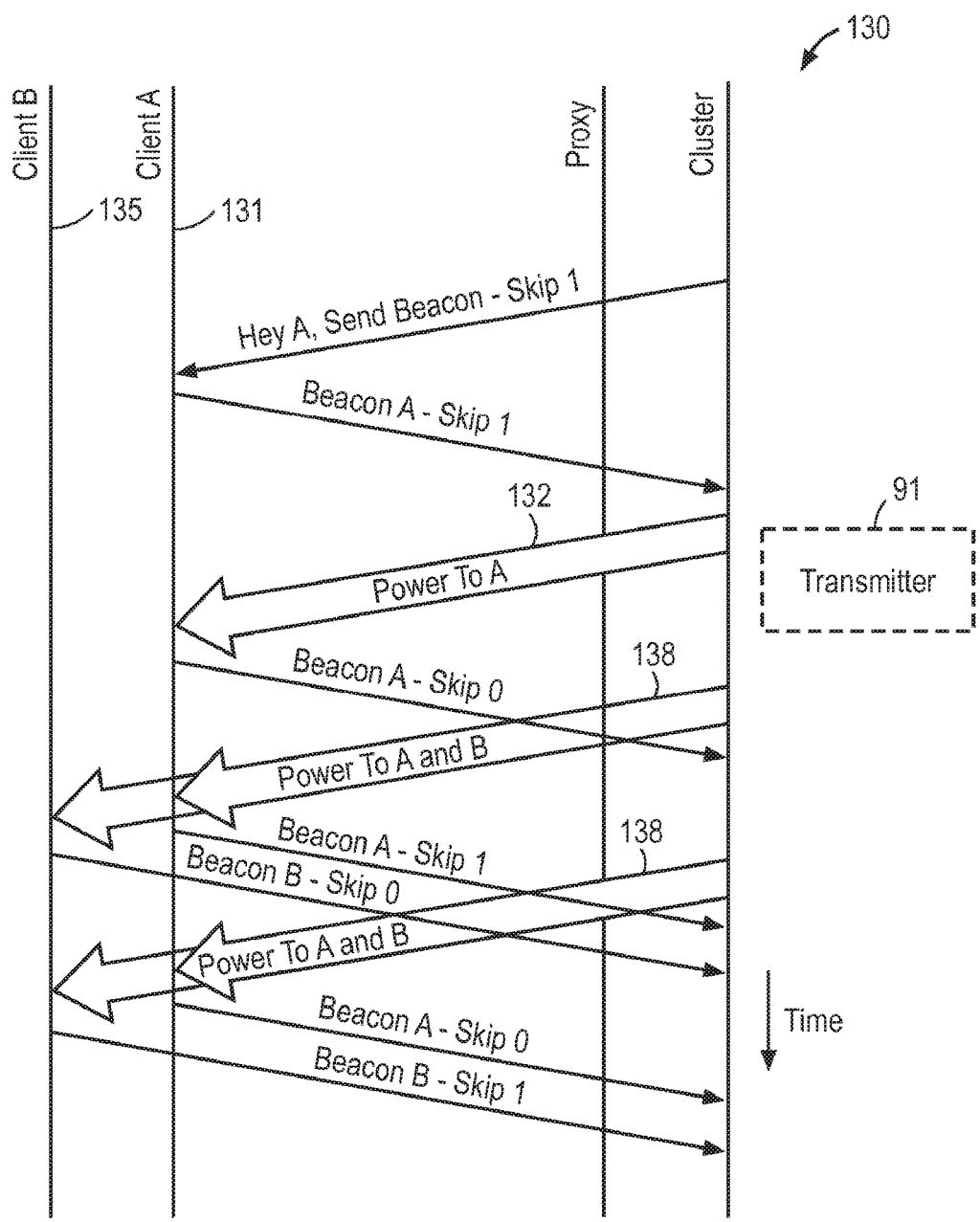

Continuing with the communication example 130 shown in FIG. 13, just after the point where the transmitter 91 has requested and received a beacon request from each of the two active client receivers (client receiver A 131 and client receiver B 135), the two beacons have set up the phase relationships of all the antennae, so the power pulses can be directed to either receiver as desired. Both receivers are waiting for power pulses (from somewhere in a power burst), and both are expecting to disregard their first power burst and not return a beacon. This is as if they both think they are first in line.

A way is needed to get one receiver to go ahead of the other receiver, so one will return beacons for odd bursts and the other for even bursts. Otherwise, they will both respond to odd (or even) bursts, and their beacons will interfere. One way to get one receiver to ignore a burst is to have no pulses in that burst for that receiver. So, shown in FIG. 13, an entire power burst is directed exclusively to client receiver A 131, which will detect a pulse and will skip sending a beacon in response. The second client receiver B 135 (Receiver #6) has received no power pulses in that power burst, so detects no pulses, it continues waiting for a first power burst. The second client receiver B 135 (Receiver #6) is still ready to skip the first power burst it sees.

Next, a second power burst is sent containing power pulses 138 for both client receiver A 131 and the second client receiver B 135 (Receiver #6). Both receivers consult their skip status, with client receiver A 131 finding it has already skipped enough, (once) and the second client receiver B 135 (Receiver #6) finding is has not yet skipped. So the wireless power transmitter receives a beacon from client receiver A131—now skipping odd power bursts. Subsequent power bursts will be either even or odd, and will receive a beacon from client receiver A 131 or the second client receiver B 135 (Receiver #6) based on the skip factor of one they both have been commanded to use.

Skip factors greater than one can be used. With three Receivers, for example, a skip factor of two will let each Receiver skip sending beacons when either one of the other two are sending beacons. This scheme can work with multiple receivers, but depends upon trouble-free reception of beacons from each receiver.

In another alternative embodiment, receivers and transmitters can interact by having the transmitter request beacons from the receivers of which it becomes aware, rendering no skip factor necessary. Receiver responds to a "Regular Announcement" with a data packet describing itself ("My Story"). A specific beacon request naming that receiver can address it whenever the transmitter decides. Once the receiver responds with a beacon, it will receive power from pulses inside subsequent power bursts. This is a less efficient protocol, because time must be spent asking each receiver to send a beacon, rather than having them all wait their turns.

In a preferred embodiment, the normalized Battery Need data provided to the transmitter by the data controller is TTD. This allows the transmitter to compare the receivers according to TTD, including Momentary TTD, Smoothed TTD and Predicted TTD.

In an alternative embodiment (the "1BitDirective"), the need data is either a one "1" or a zero "0". "1" corresponds to more power ("MorePower"); and "0" to less power ("LessPower"). This alternative embodiment loses some degree of information on battery need, but gains on the preferred embodiment due to reduced complexity.

In the 1BitDirective, the receiver monitors the sign (+ or −) of the storage battery current, and requests MorePower when the current is flowing out from the battery; LessPower when the current reading is flowing into the battery.

In addition, the receiver will request LessPower when MaxChargeRate is exceeded and when StateOfCharge is "full" (e.g. 100% or over 90%).

The receiver's task can be expressed in Program Design Language (PDL) as follows:

```
If BatteryCurrent > 0 Then
    If BatteryCurrent > MaxChargeRate Then
        Request "LessPower"
    Else
        If StateOfCharge = Full Then
            Request "LessPower"
        Else
            Request "MorePower"
        Endif
    Endif
Else
    Request "MorePower"
Endif
```

The above code increases demands for power until Max-ChargeRate is exceeded or the StateOfCharge is full. This will occur regardless of variations in the DrainRate. The code snippet needs to be run only one time per beacon. An electronic circuit could ready implement this code using circuit design techniques known in the art.

A minimal packet contains only what it must, including the Start Bytes, Receiver ID, and possibly one or two message types. The message types would be pre-assigned numbers. Usually these numbers refer to a specific layout of the data section of the message.

One possibility is to have a layout with one bit in the data section. This one bit would carry the MorePower or Less-Power directive. Alternatively, the header can employ message layouts with no data bits in the data section. Instead, the message type itself carries the MorePower or LessPower directive.

The packets comprise one or more of StartBytes, ReceiverID's, MessageTypeBytes, and DataBytes.

Start bytes: This could be, for example, 2 bytes containing "0xA55A", which might be an uncommon enough sequence.

Receiver ID byte: This Receiver ID could be anything unique. In IEEE 802 format, let us presume a particular Receiver had 01:23:45:67:89:AB. But that kind of ID is too long for a beacon. The protocol described earlier allows for a Receiver ID to be assigned by the wireless power transmitter. One byte can uniquely identify over 200 Receivers. For this example, the byte "0xAB" has been selected.

Message Type: This would be two bytes that were assigned to communicate the 1BitDirective layout. An efficient way is to have MorePower and LessPower versions of some unrelated often-used message type. Alternatively, let message type 0x62 be the message type for 1BitDirectives that have one bit of data in the layout.

Data Bytes: In the alternative 1BitDirective embodiment, the packet contains Data Bytes. Since the minimum count is likely one byte, we can encode MorePower as "0x01" and LessPower as "0x00". This more than carries the one bit of information needing to be sent.

The entire example 1BitDirective message (in hexadecimal) is: "A5 5A AB 62 01"

This message breaks out as two Start Bits, "A5" and "5A", followed by Receiver ID (assigned by the wireless power transmitter) of "AB", and then by the Message Type of "62". The #62 message type is known to have a single byte containing a single bit at the least significant position (rightmost). Code to extract message 62 is as follows:

MorePower=("0x01"==Payload(0))

Payload is the byte array received from the data portion of the receiver beacon. There is only one payload byte, at offset zero. If Payload is equal to "0x01" then RequestedMorePower is True. Otherwise, RequestedMorePower is False (because it actually requested Less:Power, which is the equivalent in this scheme).

The summary of what the packet says is:

| Receiver# | Receiver ID of receiver communicating |
|---|---|
| MorePower | True/False on wanting MorePower |

This information is fed into a transmitter that tracks the requests of each receiver.

If the 1-bit more/less signal is sent by the receiver with every beacon, the result can be thought of as similar to a pulse-width-modulated feedback signal.

In Program Design Language (PDL) format, the transmitter executes the following procedure:

```
For Each Receiver
    If MorePower[Receiver]
        Increase NumberOfPulses[Receiver]
    Else
        Decrease NumberOfPulses[Receiver]
    Endif
Next Receiver
```

NumberOfPulses[Receiver] is the number of power pulses the transmitter is currently allocating to Receiver.

One embodiment has, for example, 100 beacons per second and 100 pulses per beacon cycle from all the receivers in the area. (Any other count is possible; 100 is picked as an easy-to-calculate example.)

With 100 beacons per second, a single receiver could request MorePower. In response, the transmitter would smoothly ramp power from zero to 100 pulses per second. Suitable protections could prevent "Increase" and "Decrease" code from exceeding the 100 pulse allotment. With for example 20 competing receivers, each could cover the entire range within 5 seconds, in this example. This is quite adequate response time.

Once the transmitter knows the NumberOfPulses each receiver has been allocated, and provided that the total of the pulses allocated ("TotalPulses") is less than or equal to the pulses available, the transmitter allocates the pulses as follows:

```
Pulse = 1
For Each Receiver
    For (I=0; I<NumberOfPulses[Receiver]; I++)
        PulseForReceiver[Pulse++] = Receiver
    Next I
Next Receiver
```

This starts allocating pulses from the first power pulse in the burst. The code walks through the list of receivers, allocating to each subsequent receiver the number of pulses assigned to that receiver.

The 1BitDirective approach to pulse allocation can also be called "Ramp and Dither". For example, after a cell phone had been left unused overnight near a transmitter, the morning would find the battery fully charged. NumberOfPulses would be dithering up or down very near zero power at the receiver.

When the cell phone is turned on in the morning, battery current would immediately be flowing out to the cell phone circuitry, resulting in MorePower requests. These requests would continue until the transmitter power level rose sufficiently to exceed the demand from the receiver's electronics, at which time requests for LessPower would occur.

At the transmitter, the NumberOfPulses for that receiver would ramp up to a certain value and then dither at a level supplying power just as needed. If the ramping process had taken too long, the StateOfCharge would no longer indicate "Full" and additional MorePower requests would result until StateOfCharge returned to "Full".

At the transmitter, TotalPulses may be more than the total available (e.g. 100 pulses in the above example). Several approaches for reducing the requested total are possible.

One approach divides TotalPulses by a factor, say 100 to obtain a "division factor". Then NumberOfPulses for each receiver is divided by that factor to determine the actual number of pulses to be sent. This starves all receivers equally, which may be problematic for some receivers.

It also would not be long before all starved receivers are asking for all 100 pulses. This could result in all receivers receiving the same amount of power, which also may be problematic for some receivers. However, for example, twenty receivers getting ¹/₂₀th of the total of the wireless power available is a reasonable response.

Another approach would be to have a code that repeatedly passes through the list subtracting one from every receiver's allocation until the total was 100. A 10 msec burst of power pulses could then be sent out, in this example.

An improvement would be to not allow any receiver's allocation to drop below 1 pulse. A further improvement would be to not demote the allocations of those units that have no internal storage, such as a local battery. This "no battery" status would be known for each receiver and could be tested with something like "CanDemote" code;

```
While TotalPulses > 100
    Receiver = Next(Receiver)
    If TotalPulses > 100 Then
        If CanDemote[Receiver] Then
            Pulses[Receiver] = Max(1,
NumberOfPulses[Receiver]-1)
            RecalculateTotalPulses
        Endif
    Endif
Wend
```

This will starve all the receivers that can be demoted, but equally so. The receivers with no internal storage will have all the power they demand, which is a necessary response. One downside is that the receivers will all take longer to re-charge their batteries, resulting in a graceful failure mode.

However, a transmitter surrounded by an RF absorbing environment and many hungry receivers will be overwhelmed and may even allow some receivers to discharge if their DrainRate is high enough. There could be some indication to the transmitter owner that the transmitter is being called upon to provide more power than it can.

The embodiment of the invention that employs Predicted Battery Need is capable of far richer analysis than the other embodiments described above. Once predicted use is relied upon by the transmitter, rather than recent use (e.g. Momentary Battery Need and Smoothed Battery Need), specific, differentiated characteristics of the receivers becomes more important.

The discussion below explores additional parameters for describing these different receiver characteristics, as well as a classification of receiver types by power use. The purpose of this information is to enable the transmitter to develop a rich model of the collection of receivers it serves.

The chief benefit of performing this rich predictive modeling and depending on this modeling for allocating pulses within power bursts is to reduce the amount of computation needed by the transmitter on each cycle of power burst delivery.

The drawback of depending on a priori models of receiver power use arises when the actual usage deviates significantly from the model.

Beyond the Battery Need Metrics and Battery Rating Metrics described earlier, predictive modeling is optimized by using additional parameters.

The Predictive Parameters described below are sufficient to schedule a series of power pulses to be sent to various receivers and provide customized levels of power to each one. When these parameters are available to the transmitter from all the receivers, the values can be used by the transmitter to determine the best allocation of the available power pulses.

Each receiver will receive a number of power pulses sufficient to power the receiver and to recharge the battery (if there is one) to cover the expected short-term future usage, within the predicted time that receiver is expected to still receive wireless power, regardless of battery size or present level of charge, but at a safe rate of re-charge.

Some receivers are mounted on walls near a transmitter at all times. Other receivers, particularly portable ones, will not have access to wireless power in remote locations and be used there. Some portable receivers only have access to wireless power for a short time per day; others may have regular overnight access.

The following Power Availability Parameters characterize the access a receiver has to wireless power:

| | |
|---|---|
| Wireless Power Available | [. . .] minutes/day |
| Average Duration of Wireless Power Access | [. . .] minutes |
| Number of Power Access Sessions | [. . .] per day. |

Preferably, these parameters are also collected and maintained in the receiver itself.

Some wireless power receivers draw little power; others draw much power. Some receivers draw power continuously because they are in operation every minute of the day; others draw power only when a person is using them, or when a sensor (or other receiver) activates them. Those receivers using power intermittently will typically have short or long sessions of power draw; the remainder of the time they draw very low standby power, or no power.

The following Power Draw Parameters characterize wireless power receivers power draw:

| | |
|---|---|
| Typical Power Draw | [. . .]Watts |
| For | [. . .] minutes/day |
| Average Duration of Typical Power Draw session | [. . .] minutes |
| Number of Power Draw Sessions | [. . .] per day |

Preferably, these parameters are measured and maintained in the receiver itself, and sent on-demand to the transmitter for use in planning the allocation of power pulses.

Some receivers may wish to manage the power coming from the transmitter, so additional Demand Parameters can be included.

| | |
|---|---|
| Please provide this level of power now | [. . .]Watts |
| Transmitter to use its discretion | [Y/N] |

In one approach, a convention is established whereby the requested power level is a demand with an "N" in this field, but with "Y" in the field, the transmitter can select the power level provided to the receiver.

Different classes of receivers, classified by power availability and draw patterns, tend to generate different classes of Predictive Parameters.

Receivers with no means to store power themselves must be supplied sufficient power at all times by a wireless power source. The locations of these receivers must be known to the source at all times, so that wireless power can be directed to their locations. The location data must be retained by the transmitter even after main power has been interrupted for a protracted period, such as during a power failure. Therefore, all location information for fully dependent receivers will involve non-volatile memory storage in the transmitter. These receivers can be identified by the "Total Energy Storage Capacity" parameter, which would typically be zero. An example is an electric water pump keeping water in pipes warm by recirculating water through the water heater.

Receivers that must always be in service must also be supplied sufficient power at all times by a transmitter or large backup battery. This is a class of receiver similar to the Fully Dependent Receiver, except these would typically have local energy storage to power a beacon—in order to insure the receipt of power from the transmitter when it is available. A possible example is an oxygen concentrator medical receiver to aid in breathing) with a battery backup to ride through power failures.

Exhausted Receivers are those receivers which have already drained their power reserves and have been forced to shut down. These receivers will receive a high power pulse priority in order to recharge quickly, but will need a special treatment.

The special treatment is required because normally, a beacon signal sent by a receiver will be received by a nearby wireless power source, which will then respond by transmitting power to that receiver's location. These are typically portable receivers, so their location is not known. An exhausted receiver has no available power to generate a beacon, and therefore no nearby transmitter can become aware of the receiver. Instead of a beacon "moving the power to the receiver", the receiver must be moved to the power.

In this case, the receiver with no reserve power will be handled by having at least one specific location always provided with wireless power. When an exhausted receiver is placed in this "resurrection spot", wireless power is provided to it until it is able to produce a beacon. At this point, if use of the receiver is demanded immediately, it can be used while being charged as long as it remains within reach of a wireless power source. It is anticipated that the transmitter will provide sufficient power to both charge and power the receiver while it is within range, even if it is a receiver needing high power along with a quick-charge requirement.

Receivers having nearly exhausted their power reserves will begin to be charged when they enter the wireless power field. This will occur when their beacon signal is detected by a transmitter able to supply power to the receiver. Power supplied to these receivers will have a priority over other receivers that have sufficient power to operate. The Present Reserve Capacity parameter is important for these receivers, so they can be provided with a quick-charge power pulse train.

Receivers having high power requirements must be allocated more power slots from the available power pool than receivers needing little power. As the technology matures, providing larger amounts of power will become possible. Receivers with high continuous power requirements such as a hair dryer will need stable allocations during use. When the transmitter is providing power near the limit of its capacity, some receivers can tolerate varying power levels, and will have their loads shed from the total power output as needed. A good example of this is an electric car charging in a garage. A bad example is a hair dryer that appears to randomly fall back to cooler settings in order to accommodate a wireless power source's limited capacity. (The hair dryer would likely be considered defective by most users.) The "Typical Power Draw" parameter is key in identifying these receivers. The hair dryer may also wish to assert, for example "Please provide 1000 W now, no discretion" status.

Some receivers receive continuous use, such as a radio or a TV left on at all times. As before, stable allocations of power slots will need to be provided for these always-on receivers. The "Average Duration of Typical Power Draw Session" will be important in identifying these receivers.

Some receivers receive heavy use throughout the day, others of the same make and model receive little use. Take the case of two identical cell phones, one owned by a stock-broker nearly always on the phone, the other owned by a retired person. Both could arrive together at a public-access transmitter having batteries with 50% of their capacity remaining. This could represent 4 hours of reserve capacity to one, and 4 days of reserve capacity to the other. The receivers not only report reserve capacity, but the level and minutes/day of typical use. With this information provided to the transmitter, both could leave together with 80% reserve capacity in their respective units—even though the stock broker's phone received much more power.

Some receivers have limited or intermittent usage patterns. A TV remote may face heavy and yet intermittent usage for a few hours per day. A stud-finder may face light use every few years. These sorts of receivers may be best re-charged only after a certain level of discharge has been reached. Some battery technologies—NiCad in particular—do not respond well to being kept on a charger continuously. Suitable algorithms used by the transmitter can manage these batteries, charging them when necessary.

In some homes, a household intercom might not get much use. If the designers expected the unit to use wireless power, a very small battery sufficient only to get out one or two beacons could be used. A "Please provide 100 mWatt now" update could be sent whenever the unit was called into use.

An electroluminescent night light with no battery could be kept lit, and varying the average number of power pulses provided per second could provide control over the brightness.

Motion sensors and wall clocks do not move out of the wireless power field.

In the case of a vacuum cleaner stored in a shed without wireless power nearby, the wireless power receiver unit could turn on the beeper when the battery needed recharging. It could then be brought into the house (near the wireless power source) and recharged, even while being used. The power pulse allocator would note for example, a low "Wireless Power Available 0 minutes/day" and a "Present Reserve Capacity 4%", and calculate a suitable high-power rush, limited by "Maximum continuous charge rate for this battery".

For receivers stored in remote locations, a Status Repeater could allow the receiver to send its battery charge level to the transmitter. (The repeater would only retransmit data to the wireless power transmitter, not retransmit power to the receiver.) The transmitter would then notify the user that the remote receiver requires charging. The remote Status Repeater might use power line communications or WiFi to communicate with the transmitter along with the same radio communications technology that the transmitter uses to communicate with the receiver.

While this invention has been described in terms of several embodiments, there are alterations, modifications, permutations, and substitute equivalents, which fall within the scope of this invention. Many of these modifications can also be practiced alone or in different combinations.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A wireless power transmission apparatus comprising:
   allocation means for allocating wireless power pulses among wireless power receivers in accordance with battery charging requests received from one or more of the wireless power receivers; and
   control means for directing multiple antennas of an antenna array to transmit the allocated wireless power pulses to different ones of the wireless power receivers by modifying phases of at least a subset of the multiple antennas.

2. The wireless power transmission apparatus of claim 1, further comprising:
   receiving means for receiving the battery charging requests from the one or more wireless power receivers.

3. The wireless power transmission apparatus of claim 2, wherein the battery charging requests are received with beacon signals from the one or more wireless power receivers, the beacon signals indicating relative locations of the one or more wireless power receivers in a wireless power delivery environment.

4. The wireless power transmission apparatus of claim 2, wherein the battery charging requests are received within data packets from the one or more wireless power receivers via a side-channel.

5. The wireless power transmission apparatus of claim 1, wherein the control means are further configured for modifying one or more of transmission frequency, timing, amplitude or direction of the multiple antennas of the antenna array to transmit the allocated wireless power pulses.

6. The wireless power transmission apparatus of claim 1, wherein the allocation means allocates the wireless power pulses to a subset of the wireless power receivers based on charging needs of the wireless power receivers, and wherein the battery charging requests indicate the charging needs of the corresponding wireless power receivers.

7. The wireless power transmission apparatus of claim 6, wherein the allocation means further allocates the of wireless power pulses to the wireless power receivers based on a predictive model.

8. The wireless power transmission apparatus of claim 1, wherein one or more of the battery charging requests includes at least one metric, the metric comprising one or more of a State-of-Charge, a Drain-Rate or a Received-Power.

9. The wireless power transmission apparatus of claim 8, wherein the metric is encoded or encrypted.

10. The wireless power transmission apparatus of claim 1, further comprising:
    processing means for normalizing the battery charging need requests.

11. The wireless power transmission apparatus of claim 1, wherein the antenna array comprises a phased transmission array.

12. An apparatus comprising:
    one or more computer readable storage media; and
    program instructions stored on the one or more computer readable storage media, wherein the program instructions, when executed by a processing system, direct the processing system to:
        allocate wireless power pulses among wireless power receivers in accordance with battery charging requests received from one or more of the wireless power receivers; and
        direct multiple antennas of an antenna array to transmit the allocated wireless power pulses to different ones of the wireless power receivers by modifying phases of at least a subset of the multiple antennas.

13. The apparatus of claim 12, wherein the program instructions, when executed by the processing system, further direct the processing system to extract the battery charging requests from beacon signals received from the one or more wireless power receivers.

14. The apparatus of claim 12, wherein the program instructions, when executed by the processing system, further direct the processing system to extract the battery charging requests from data packets received from the one or more wireless power receivers via a side-channel.

15. The apparatus of claim 12, wherein the program instructions, when executed by the processing system, further direct the processing system to modify one or more of transmission frequency, timing, amplitude or direction of the multiple antennas of the antenna array to transmit the allocated wireless power pulses.

16. The apparatus of claim 12, wherein the program instructions, when executed by the processing system, direct the processing system to allocates the wireless power pulses to a subset of the wireless power receivers based on charging needs of the wireless power receivers, wherein the battery charging requests indicate the charging needs of the corresponding wireless power receivers.

17. A wireless power transmission system comprising:
    an antenna array comprising multiple antennas;
    a processing system configured to:
        allocate wireless power pulses among wireless power receivers in accordance with battery charging requests received from one or more of the wireless power receivers; and
        direct multiple antennas of an antenna array to transmit the allocated wireless power pulses to different ones of the wireless power receivers by modifying phases of at least a subset of the multiple antennas.

18. The wireless power transmission system of claim 17, wherein the processing system is further configured to receive the battery charging requests from the one or more wireless power receivers.

19. The wireless power transmission system of claim 17, wherein the battery charging requests are received with beacon signals from the one or more wireless power receivers or within data packets from the one or more wireless power receivers via a side-channel.

20. The wireless power transmission system of claim 17, wherein the processing system is further configured to modify one or more of transmission frequency, timing, amplitude or direction of the multiple antennas of the antenna array to transmit the allocated wireless power pulses.

* * * * *

UNITED STATES PATENT AND TRADEMARK OFFICE
CERTIFICATE OF CORRECTION

PATENT NO. : 10,312,744 B2
APPLICATION NO. : 15/367900
DATED : June 4, 2019
INVENTOR(S) : Hatem Zeine et al.

It is certified that error appears in the above-identified patent and that said Letters Patent is hereby corrected as shown below:

In the Specification

Column 4, Line 38, before "power" insert --how much--

Signed and Sealed this
Sixth Day of October, 2020

Andrei Iancu
*Director of the United States Patent and Trademark Office*